United States Patent
Prebil et al.

(10) Patent No.: US 10,232,532 B1
(45) Date of Patent: Mar. 19, 2019

(54) METHOD FOR FABRICATING TAPERED THERMOPLASTIC COMPOSITE PARTS

(75) Inventors: Charles R. Prebil, University City, MO (US); James R. Fox, University City, MO (US); Randall Dow Wilkerson, O'Fallon, MO (US); Sharon Sher Ying Wong, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 1124 days.

(21) Appl. No.: 13/419,187

(22) Filed: Mar. 13, 2012

Related U.S. Application Data

(63) Continuation-in-part of application No. 11/697,378, filed on Apr. 6, 2007, now Pat. No. 8,425,708, which is a continuation-in-part of application No. 11/347,122, filed on Feb. 2, 2006, now Pat. No. 7,807,005, application No. 13/419,187, filed on Mar. 13, 2012, which is a continuation-in-part of application No. 12/868,896, filed on Aug. 26, 2010, which is a continuation of application No. 11/347,122, filed on Feb. 2, 2006, now Pat. No. 7,807,005, application No. 13/419,187, filed on Mar.

(Continued)

(51) Int. Cl.
*B29C 43/36* (2006.01)
*B29C 65/00* (2006.01)
*B29C 33/30* (2006.01)
*B64C 1/00* (2006.01)

(52) U.S. Cl.
CPC ............ *B29C 43/36* (2013.01); *B29C 33/306* (2013.01); *B29C 66/721* (2013.01); *B29C 2043/3665* (2013.01); *B64C 2001/0072* (2013.01)

(58) Field of Classification Search
CPC ......... B29C 65/00; B29C 70/46; B29C 70/50; B29C 70/525; B29C 53/04; B29C 43/228; B29C 43/203; B29C 70/504; B29C 43/00; B29C 43/021; B29C 43/18; B29C 47/003; B64C 1/06
See application file for complete search history.

(56) References Cited

U.S. PATENT DOCUMENTS 2,440,228 A   4/1948 Yardeny et al.
2,708,288 A   5/1955 Fuller et al.
(Continued)

FOREIGN PATENT DOCUMENTS

BE   834458         2/1976
DE   1504302 A1    4/1969
(Continued)

OTHER PUBLICATIONS

International Search Report, dated Oct. 23, 2007, regarding Application No. PCT/US2007/003021 (WO2007092371), 3 pages.
(Continued)

*Primary Examiner* — Scott W Dodds
(74) *Attorney, Agent, or Firm* — Yee & Associates, P.C.

(57) ABSTRACT

Consolidation tooling is used in a continuous compression molding machine to produce a fiber reinforced thermoplastic part having a varying height. The tooling includes first and second tool dies adapted to compress and form a multi-ply stack of thermoplastic prepreg into a part, and at least a first tooling sleeve movable through the first and second tool dies. The tooling sleeve has at least a first tapered portion engageable with the multi-ply stack.

14 Claims, 18 Drawing Sheets

Related U.S. Application Data 13, 2012, which is a continuation-in-part of application No. 11/584,923, filed on Oct. 20, 2006, now Pat. No. 8,333,858, which is a continuation-in-part of application No. 11/347,122, filed on Feb. 2, 2006, now Pat. No. 7,807,005, application No. 13/419,187, filed on Mar. 13, 2012, which is a continuation-in-part of application No. 11/699,653, filed on Jan. 29, 2007, which is a continuation-in-part of application No. 11/584,923, filed on Oct. 20, 2006, now Pat. No. 8,333,858, which is a continuation-in-part of application No. 11/347,122, filed on Feb. 2, 2006, now Pat. No. 7,807,005, application No. 13/419,187, filed on Mar. 13, 2012, which is a continuation-in-part of application No. 12/398,071, filed on Mar. 4, 2009, now Pat. No. 8,691,137.

(56) References Cited

U.S. PATENT DOCUMENTS

| | | |
|---|---|---|
| 4,061,817 A | 12/1977 | Maxel |
| 4,103,470 A | 8/1978 | Cook |
| 4,151,030 A | 4/1979 | Hensel |
| 4,151,031 A | 4/1979 | Goad et al. |
| 4,225,553 A * | 9/1980 | Hirota .................. B21D 22/22 264/292 |
| 4,414,266 A | 11/1983 | Archer et al. |
| 4,414,269 A | 11/1983 | Lubowitz et al. |
| 4,462,946 A | 7/1984 | Goldsworthy |
| 4,571,355 A | 2/1986 | Elrod |
| 4,608,220 A | 8/1986 | Caldwell et al. |
| 4,614,013 A | 9/1986 | Stevenson |
| 4,674,712 A | 6/1987 | Whitener et al. |
| 4,749,613 A | 6/1988 | Yamada et al. |
| 4,759,815 A | 7/1988 | Frey |
| 4,818,460 A | 4/1989 | Nied |
| 4,859,267 A | 8/1989 | Knoll |
| 4,913,910 A | 4/1990 | McCarville et al. |
| 4,944,824 A | 7/1990 | Gupta |
| 4,970,044 A | 11/1990 | Kim et al. |
| 4,980,013 A | 12/1990 | Lowery |
| 5,021,283 A | 6/1991 | Takenaka et al. |
| 5,026,447 A | 6/1991 | O'Connor |
| 5,026,514 A | 6/1991 | Hauwiller et al. |
| 5,043,128 A | 8/1991 | Umeda |
| 5,057,175 A | 10/1991 | Ashton |
| 5,064,439 A | 11/1991 | Chang et al. |
| 5,139,407 A | 8/1992 | Kim et al. |
| 5,182,060 A | 1/1993 | Berecz |
| 5,192,330 A | 3/1993 | Chang et al. |
| 5,192,383 A * | 3/1993 | Cavin .................. B29C 70/52 156/166 |
| 5,320,700 A | 6/1994 | Hall et al. |
| 5,413,472 A | 5/1995 | Dietterich et al. |
| 5,681,513 A | 10/1997 | Farley |
| 5,716,487 A | 2/1998 | Sumerak |
| 5,759,325 A | 6/1998 | Davis |
| 5,820,804 A * | 10/1998 | Elmaleh ............... B29C 33/308 156/172 |
| 5,958,550 A | 9/1999 | Childress |
| 6,007,917 A | 12/1999 | Weigel et al. |
| 6,024,555 A | 2/2000 | Goodridge et al. |
| 6,114,012 A | 9/2000 | Amaoka et al. |
| 6,162,314 A | 12/2000 | Kassuelke et al. |
| 6,291,049 B1 | 9/2001 | Kunkel et al. |
| 6,319,346 B1 | 11/2001 | Clark et al. |
| 6,425,969 B1 | 7/2002 | van den Akker |
| 6,689,448 B2 | 2/2004 | George et al. |
| 6,696,009 B2 | 2/2004 | Davis |
| 6,764,057 B2 | 7/2004 | Fanucci et al. |
| 6,869,558 B2 | 3/2005 | Polk, Jr. et al. |
| 7,186,361 B2 | 3/2007 | Kasai et al. |
| 7,191,982 B2 | 3/2007 | Vetillard et al. |
| 7,300,693 B2 | 11/2007 | Albers et al. |
| 7,419,372 B2 | 9/2008 | Kasai et al. |
| 7,431,875 B2 | 10/2008 | Rule |
| 7,513,769 B2 | 4/2009 | Benson et al. |
| 7,670,525 B2 | 3/2010 | Weidmann et al. |
| 7,807,005 B2 | 10/2010 | Rubin et al. |
| 7,871,553 B2 | 1/2011 | Wilkerson et al. |
| 8,013,448 B2 | 9/2011 | Lin |
| 8,151,529 B2 | 4/2012 | Weidmann et al. |
| 8,163,221 B2 | 4/2012 | Suzuki et al. |
| 2002/0088549 A1 | 7/2002 | Fanucci et al. |
| 2002/0135093 A1 | 9/2002 | Davis |
| 2003/0044570 A1 | 9/2003 | George et al. |
| 2003/0168555 A1 | 9/2003 | Livi et al. |
| 2003/0175520 A1 | 9/2003 | Grutta et al. |
| 2003/0232176 A1 | 12/2003 | Polk, Jr. et al. |
| 2004/0009338 A1 | 1/2004 | Jo et al. |
| 2004/0096535 A1 | 5/2004 | Hudecek et al. |
| 2005/0029707 A1 | 2/2005 | Kasai et al. |
| 2005/0053765 A1 | 3/2005 | Albers et al. |
| 2005/0056362 A1 | 3/2005 | Benson et al. |
| 2005/0252603 A1 | 11/2005 | Rule |
| 2006/0011289 A1 | 1/2006 | Suriano |
| 2006/0083806 A1 | 4/2006 | Kasai et al. |
| 2006/0216480 A1 | 9/2006 | Weidmann et al. |
| 2006/0226288 A1 | 10/2006 | Vetillard et al. |
| 2006/0249868 A1 | 11/2006 | Brown et al. |
| 2007/0012858 A1 | 1/2007 | Callis |
| 2007/0175571 A1 | 8/2007 | Rubin et al. |
| 2007/0175572 A1 | 8/2007 | Rubin et al. |
| 2007/0175573 A1 | 8/2007 | Fox et al. |
| 2007/0175575 A1 | 8/2007 | Rubin et al. |
| 2008/0168619 A1 | 7/2008 | Gonzalez et al. |
| 2008/0185736 A1 | 8/2008 | Lin |
| 2008/0185756 A1 | 8/2008 | Wilkerson et al. |
| 2008/0277058 A1 | 11/2008 | Schmier, II et al. |
| 2009/0065977 A1 | 3/2009 | Suzuki et al. |
| 2009/0074905 A1 | 3/2009 | Matsen et al. |
| 2009/0078362 A1 | 3/2009 | Wilkerson et al. |
| 2010/0148005 A1 | 6/2010 | Weidmann et al. |
| 2010/0225016 A1 | 9/2010 | Prebil et al. |
| 2010/0319841 A1 | 12/2010 | Rubin et al. |
| 2011/0206906 A1 | 8/2011 | Rubin et al. |
| 2012/0175049 A1 | 7/2012 | Suzuki et al. |
| 2013/0202871 A1 | 8/2013 | Hidaka et al. |
| 2015/0053333 A1 | 2/2015 | Prebil et al. |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 A1 | 12/1991 |
| DE | 29711917 U1 | 8/1997 |
| EP | 0024895 A2 | 3/1981 |
| EP | 0277727 A1 | 8/1988 |
| EP | 0317861 A2 | 5/1989 |
| EP | 1336469 A1 | 8/2003 |
| EP | 1504880 A1 | 2/2005 |
| EP | 1614624 A1 | 1/2006 |
| EP | 1666353 A1 | 6/2006 |
| EP | 1813404 A2 | 8/2007 |
| EP | 1995040 A1 | 11/2008 |
| EP | 2014448 A2 | 1/2009 |
| FR | 2384604 A1 | 10/1978 |
| FR | 2587649 A1 | 3/1987 |
| FR | 2888155 A1 | 1/2007 |
| GB | 531357 A | 1/1941 |
| GB | 1157239 A | 7/1969 |
| JP | 2007001298 A | 1/2007 |
| WO | 8302085 A1 | 6/1983 |
| WO | 8810186 A1 | 12/1988 |
| WO | 2007092371 A2 | 8/2007 |
| WO | 2008073164 A2 | 6/2008 |
| WO | 2008094227 A1 | 8/2008 |
| WO | 2008097847 A1 | 8/2008 |

(56) References Cited

FOREIGN PATENT DOCUMENTS

| WO | 2010101744 A2 | 9/2010 |
|---|---|---|
| WO | 2011106117 A1 | 9/2011 |

OTHER PUBLICATIONS

International Search Report, dated Jul. 17, 2008, regarding Application No. PCT/US2008/052806, (WO2007092371), 2 pages.
Preliminary Amendment, dated Aug. 1, 2008, regarding U.S. Appl. No. 11/347,122, 39 pages.
Response to Office Action, dated Apr. 6, 2009, regarding U.S. Appl. No. 11/347,122, 14 pages.
Response to Final Office Action, dated Sep. 9, 2009, regarding U.S. Appl. No. 11/347,122, 13 pages.
Response to Office Action, dated Mar. 19, 2010, regarding U.S. Appl. No. 11/347,122, 16 pages.
Response to Final Office Action, dated Jun. 29, 2010, regarding U.S. Appl. No. 11/347,122, 9 pages.
Response to Office Action, dated May 4, 2010, regarding U.S. Appl. No. 11/584,923, 27 pages.
Response to Final Office Action, dated Nov. 15, 2010, regarding U.S. Appl. No. 11/584,923, 23 pages.
Response to Office Action, dated Jan. 27, 2012, regarding U.S. Appl. No. 11/584,923, 14 pages.
Response to Office Action, dated Aug. 16, 2010, regarding U.S. Appl. No. 11/697,378, 35 pages.
Response to Final Office Action, dated Jan. 27, 2011, regarding U.S. Appl. No. 11/697,378, 28 pages.
Response to Office Action, dated Dec. 19, 2011, regarding U.S. Appl. No. 11/697,378, 40 pages.
USPTO Final Office Action, dated Mar. 2, 2012, regarding U.S. Appl. No. 11/697,378, 6 pages.
Response to Final Office Action, dated Mar. 22, 2012, regarding U.S. Appl. No. 11/697,378, 9 pages.
Response to Office Action, dated Apr. 28, 2010, regarding U.S. Appl. No. 11/699,653, 24 pages.
Response to Final Office Action, dated Nov. 15, 2010, regarding U.S. Appl. No. 11/699,653, 18 pages.
Response to Office Action, dated May 16, 2011, regarding U.S. Appl. No. 11/699,653, 22 pages.
Response to Final Office Action, dated Oct. 21, 2011, regarding U.S. Appl. No. 11/699,653, 33 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
Response to Office Action, dated Apr. 20, 2011, regarding U.S. Appl. No. 12/398,071, 22 pages.
Response to Final Office Action, dated Sep. 15, 2011, regarding U.S. Appl. No. 12/398,071, 17 pages.
USPTO Office Action dated Jun. 18, 2012 regarding U.S. Appl. No. 11/697,378, 20 pages.
Response to Office Action dated Jul. 18, 2012 regarding U.S. Appl. No. 11/697,378, 7 pages.
USPTO Final Office Action dated Jun. 15, 2012 regarding U.S. Appl. No. 12/711,401, 33 pages.
USPTO Office Action dated Jul. 5, 2012 regarding U.S. Appl. No. 11/701,789, 30 pages.
USPTO Final Office Action dated Apr. 16, 2012 regarding U.S. Appl. No. 11/584,923, 9 pages.
Response to Final Office Action dated Jul. 16, 2012 regarding U.S. Appl. No. 11/584,923, 11 pages.
USPTO Notice of Allowance dated Jul. 25, 2012 regarding U.S. Appl. No. 11/584,923, 19 pages.
Rubin et al., "Method for Fabricating Thermoplastic Composite Parts," U.S. Appl. No. 13/673,989 and Preliminary Amendment, filed Nov. 9, 2012, 52 pages.

Final Office Action. dated Sep. 19, 2012, regarding U.S. Appl. No. 11/697,378, 10 pages.
Cai et al., "Consolidation Techniques and Cure Control," In: Handbook of Composites, Second Edition, Peters (Ed.), Chapman & Hall, London, 1998, pp. 576-577.
Final Office Action, dated Dec. 13, 2012, regarding U.S. Appl. No. 11/701,789, 9 pages.
Office Action, dated Feb. 20, 2013, regarding U.S. Appl. No. 12/398,071, 24 pages.
Office Action, dated Jan. 18, 2013 regarding U.S. Appl. No. 12/711,401, 32 pages.
EP Office Action dated Sep. 8, 2011 regarding Application No. 08728832.0-1253EPC 08728832.0-1253, Applicant The Boeing Company (5 Pages).
Loos et al., "Thermoplastic Composite Sheet Forming", Department of Engineering Science and Mechanics, Virginia Polytechnic Institute and State University (11 Pages), accessed Jan. 31, 2011, http://www.mech.northwestern.edu/fac/cao/nsfworkshop/presentations/ns7_loos.pdf.
PCT search report dated Mar. 31, 2008 regarding International application No. PCT/US2007/022234, International filing date Oct. 17, 2007, applicant The Boeing Company (14 Pages).
PCT search report dated Apr. 28, 2011 regarding International application No. PCT/US2011/022003, International filing date Jan. 21, 2011, applicant The Boeing Company (11 Pages).
PCT search report dated Oct. 27, 2008 regarding International application No. PCT/US2007/018611, International filing date Aug. 22, 2007, applicant The Boeing Company (24 Pages).
USPTO notice of allowance dated Jul. 21, 2010 regarding U.S. Appl. No. 11/347,122, (6 Pages).
USPTO final office action dated Jun. 24, 2010 regarding U.S. Appl. No. 11/347,122, (12 Pages).
USPTO non-final office action dated Nov. 23, 2009 regarding U.S. Appl. No. 11/347,122, (9 Pages).
USPTO non-final office action dated Jul. 9, 2009 regarding U.S. Appl. No. 11/347,122, (8 Pages).
USPTO non-final office action dated Mar. 12, 2009 regarding U.S. Appl. No. 11/347,122, (13 Pages).
USPTO non-final office action dated Jul. 27, 2011 regarding U.S. Appl. No. 11/697,378, (19 Pages).
USPTO final office action dated Oct. 27, 2010 regarding U.S. Appl. No. 11/697,378, (20 Pages).
USPTO non-final office action dated Apr. 15, 2010 regarding U.S. Appl. No. 11/697,378, (37 Pages).
USPTO non-final office action dated Jul. 27, 2011 regarding U.S. Appl. No. 11/584,923, (10 Pages).
USPTO final office action dated Jul. 13, 2010 regarding U.S. Appl. No. 11/584,923, (12 Pages).
USPTO non-final office action dated Feb. 4, 2010 regarding U.S. Appl. No. 11/584,923, (16 Pages).
USPTO final office action dated Jul. 7, 2011 regarding U.S. Appl. No. 11/699,653, (14 Pages).
USPTO non-final office action dated Feb. 16, 2011 regarding U.S. Appl. No. 11/699,653, (13 Pages).
USPTO final office action dated Jul. 16, 2010 regarding U.S. Appl. No. 11/699,653, (11 Pages).
USPTO non-final office action dated Feb. 2, 2010 regarding U.S. Appl. No. 11/699,653, (32 Pages).
USPTO final office action dated Oct. 12, 2011 regarding U.S. Appl. No. 11/701,789, (17 Pages).
USPTO non-final office action dated Apr. 20, 2011 regarding U.S. Appl. No. 11/701,789, (15 Pages).
USPTO final office action dated Dec. 29, 2010 regarding U.S. Appl. No. 11/701,789, (14 Pages).
USPTO non-final office action dated Jun. 21, 2010 regarding U.S. Appl. No. 11/701,789, (11 Pages).
USPTO final office action dated Mar. 25, 2010 regarding U.S. Appl. No. 11/701,789, (15 Pages).
USPTO non-final office action dated Oct. 1, 2009 regarding U.S. Appl. No. 11/701,789, (29 Pages).
USPTO non-final office action dated Dec. 16, 2011 regarding U.S. Appl. No. 12/711,401, (61 Pages).

(56) References Cited

OTHER PUBLICATIONS

USPTO final office action dated Jun. 8, 2011 regarding U.S. Appl. No. 12/398,071, (9 Pages).
USPTO non-final office action dated Jan. 24, 2011 regarding U.S. Appl. No. 12/398,071, (73 Pages).
PCT search report dated Aug. 8, 2010 regarding International application No. PCT/US2010/025176, International filing date Feb. 24, 2010, applicant The Boeing Company (6 Pages).
Office Action, dated Feb. 14, 2014, regarding U.S. Appl. No. 11/699,653, 43 pages.
Notice of Allowance, dated Nov. 20, 2013, regarding U.S. Appl. No. 12/398,071, 9 pages.
Canadian Intellectual Property Office Communication, dated Jul. 22, 2014, regarding Application No. 2,673,448, 2 pages.
Office Action, dated Jan. 22, 2014, regarding U.S. Appl. No. 13/673,989, 30 pages.
Final Office Action, dated Mar. 27, 2014, regarding U.S. Appl. No. 13/673,989, 12 pages.
Notice of allowance, dated Mar. 27, 2015, regarding U.S. Appl. No. 11/699,653, 22 pages.
Office Action dated Mar. 4, 2015, regarding U.S. Appl. No. 13/934,884, 35 pages.
Chinese Patent Office Action and Translation, dated Feb. 3, 2015, regarding Application No. CN2007800501944, 10 pages.
Notice of Allowance, dated Jul. 7, 2016, regarding U.S. Appl. No. 13/673,989, 9 pages.
Notice of Allowance, dated Sep. 8, 2016, regarding U.S. Appl. No. 14/182,215, 15 pages.
Office Action, dated Sep. 6, 2016, regarding U.S. Appl. No. 12/711,401, 27 pages.
Final Office Action, dated Aug. 8, 2016, regarding U.S. Appl. No. 14/602,699, 17 pages.
Notices of Reasons for Rejection and English Translation, dated Jul. 14, 2015, regarding Japanese Patent Application No. 2012-555007, 5 pages.
Final Office Action dated Jul. 10, 2015, regarding U.S. Appl. No. 13/934,884, 17 pages.
Office Action, dated Jun. 25, 2015, regarding U.S. Appl. No. 14/182,215, 34 pages.
Office Action, dated May 6, 2016, regarding U.S. Appl. No. 13/673,989, 20 pages.
Final Office Action, dated Oct. 19, 2015, regarding U.S. Appl. No. 14/182,215, 12 pages.
Office Action, dated Mar. 4, 2016, regarding U.S. Appl. No. 14/602,699, 48 pages.
Office Action, dated Jun. 13, 2017, regarding U.S. Appl. No. 12/711,401, 14 pages.
Final Office Action, dated Jun. 8, 2017, regarding U.S. Appl. No. 14/602,699, 20 pages.
Office Action, dated Oct. 2, 2017, regarding U.S. Appl. No. 14/538,977, 14 pages.
Final Office Action, dated Nov. 20, 2017, regarding U.S. Appl. No. 12/711,401, 34 pages.
Canadian Intellectual Property Office Communication, dated Apr. 4, 2017, regarding U.S. Pat. No. 2,790,614, 3 pages.
Office Action, dated May 24, 2018, regarding U.S. Appl. No. 12/711,401, 35 pages.
Final Office Action, dated Apr. 19, 2018, regarding U.S. Appl. No. 14/538,977, 21 pages.
Office Action, dated Jan. 26, 2018, regarding U.S. Appl. No. 14/602,699, 26 pages.
Office Action, dated Dec. 14, 2018 regarding U.S. Appl. No. 14/538,977, 28 pages.
Office Action, dated Dec. 10, 2018, regarding U.S. Appl. No. 15/831,388, 37 pages.

\* cited by examiner

METHOD FOR FABRICATING TAPERED THERMOPLASTIC COMPOSITE PARTS

CROSS REFERENCE TO RELATED APPLICATIONS

This application is a continuation-in-part of copending U.S. patent application Ser. No. 11/697,378 filed Apr. 6, 2007; Ser. No. 12/868,896 filed Aug. 26, 2010; Ser. No. 11/584,923 filed Oct. 20, 2006; Ser. No. 11/699,653 filed Jan. 29, 2007; Ser. No. 12/398,071 filed Mar. 4, 2009; and U.S. Pat. No. 7,807,005 issued Oct. 5, 2010, all of which are incorporated by reference herein. This application is also related to copending U.S. patent application Ser. No. 12/711,401 filed Feb. 24, 2010; and Ser. No. 11/701,789 filed Feb. 3, 2007, all of which applications are incorporated by reference herein.

BACKGROUND INFORMATION

1. Field

The disclosed embodiments generally relate to fabrication processes using plastic materials, and deals more particularly with a method and apparatus for fabricating thermoplastic composite parts that are tapered along their length.

2. Background

Numerous processes exist for the fabrication of Thermoplastic composite (TPC) laminates of constant thickness and straight length. In addition to non-continuous processes such as pressing, stamping and autoclave forming, there are continuous processes such as extrusion, pultrusion, roll forming, and compression molding. Although these latter processes are capable of producing parts in continuous lengths, they lack the ability to produce parts of varying thickness that are needed for lightweight aerospace structures and other structures where weight is of particular importance. Moreover, the processes mentioned above are not capable of producing parts that have tapered features, curvature and/or tailored or varying thickness along their length. Additionally, the above mentioned processes rely on the in-feed of multiple discrete lengths of TPC materials that must be cut, sorted, labeled, stored and individually fed into a fabrication machine. The use of discrete lengths of TPC material may reduce automation of the fabrication process, and may increase factory space requirements as well as material costs.

Accordingly, there is a need to provide a method and apparatus that are capable of fabricating TPC laminates having one or more tapered features along their length, including those that are curved or have tailored thicknesses. There is also a need for a method and apparatus of the type mentioned that allow the laminates to be fabricated in continuous lengths using automated continuous compression molding.

SUMMARY

The disclosed embodiments provide a method and apparatus for fabricating thermoplastic composite laminates such as beams with tapered or varying height including moldline curvature in a semi-continuous production process. The method utilizes automated equipment or hand lay-up to collate parts or components into a multi-layer stack. Each stack contains all plies, including ply build-up areas, tacked in the proper location to maintain orientation and location. The materials forming the stack may be fed continuously from spools, thereby reducing the need for cutting, sizing, labeling, sorting and storing individual lengths of the thermoplastic material. The apparatus includes consolidation tooling containing all necessary part features and is coordinated to the customized multiple ply stacks to form a single integrated composite laminate part having one or more features that change in height along the length of the part. The change in height can be a constant taper or a variable taper, potentially matching the moldline contour of an airfoil. Molding laminate parts with varying heights is accomplished using constant cross section universal dies and tooling sleeves as the part moves through a semi-continuous compression molding machine. Variable height parts can be made in several general cross sectional forms, including but not limited to I, J, Z, T and C cross sectional shaped beams. The tooling sleeves adapt the universal mold tool dies to the necessary tool surfaces for the parts. Composite laminate parts formed by the disclosed method may find use in a wide variety of applications, including, for example and without limitation, automotive and aerospace applications.

According to one disclosed embodiment, consolidation tooling is provided for use in a continuous compression molding machine to produce a fiber reinforced thermoplastic composite part having a varying height. The consolidation tooling comprises first and second tool dies adapted to compress and mold a multi-ply stack of thermoplastic prepreg into a part, and at least a first tooling sleeve. The first tooling sleeve is moveable through the first and second tool dies and has at least a first tapered portion engageable with the multi-ply stack. The first tool die is tapered along its length substantially complementary to the first tapered flange portion of the first tooling sleeve. The first tapered portion may be a tapered flange portion and the first tooling sleeve may further include a second tapered flange portion engageable with the multi-ply stack. The second tool die is tapered substantially complementary to the second tapered flange portion of the first tooling sleeve. In one embodiment, the first and second tapered flange portions of the first tooling sleeve are tapered in opposite directions. The first tooling sleeve may include a generally U-shaped cross section. The consolidation tooling further comprises third and fourth tool dies adapted to compress and mold the multi-ply stack of thermoplastic prepreg into a web region of the part, wherein one of the third and fourth tool dies is received within the first and second tooling sleeves. The first tooling sleeve may include areas of non-uniform thickness contours and may be curved along at least a portion of its length. The first tooling sleeve may be configured to mold the multi-ply stack into a beam having a cross sectional shape selected from the group including: an I-shape, a J-shape, a Z-shape, a T-shape, and a C-shape. The consolidation tooling may further comprise a second tooling sleeve moveable through the first and second dies, wherein the second tooling sleeve has at least one tapered flange portion.

According to another embodiment, continuous compression molding machine tooling is provided for producing a fiber reinforced polymer stiffener having a height that varies along a length of the stiffener. The tooling broadly comprises tool dies adapted to compress a multi-stack of thermoplastic prepreg, and at least a first elongate tooling sleeve adapted to be engaged by one of the tool dies and having a cross section that varies along its length. The first elongate tooling sleeve includes outer faces against which the multi-ply stack of thermoplastic prepreg may be molded into a shape of the stiffener. The first elongate tooling sleeve includes a web portion having a height that varies along the length of sleeve. The first elongate tooling sleeve may further include at least one flange portion extending from the web portion, wherein the flange portion has a thickness that is tapered along a length of the sleeve.

According to a further embodiment, a method is provided of continuous compression molding an elongate fiber reinforced polymer stiffener. The method comprises assembling a generally flat stack of prepreg plies and moving the flat stack of prepreg plies through a consolidation structure. The method further comprises molding and consolidating the flat stack of prepreg plies as the flat stack of prepreg plies moves through the consolidation structure, including molding a taper into the stiffener along a length of the stiffener. Molding the taper may include bringing at least a first tapered tooling sleeve into engagement with the flat stack of prepreg plies, and compressing the flat stack of prepreg plies against the first tapered tooling sleeve. Compressing the flat stack of prepreg plies against the first tapered tooling sleeve is performed by pressing a pair of tapered tool dies against the tapered tooling sleeve.

The features, functions, and advantages can be achieved independently in various embodiments of the present disclosure or may be combined in yet other embodiments in which further details can be seen with reference to the following description and drawings.

DETAILED DESCRIPTION

The disclosed embodiments provide a method and apparatus for forming a thermoplastic composite ("TPC") laminate material with one or more tapers, as well as tailored and varying thicknesses and/or curvatures in a continuous process. The embodiments have uses in a wide variety of potential applications, including for example, in the aerospace industry. The embodiments are well suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, embodiments will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Figure 1:
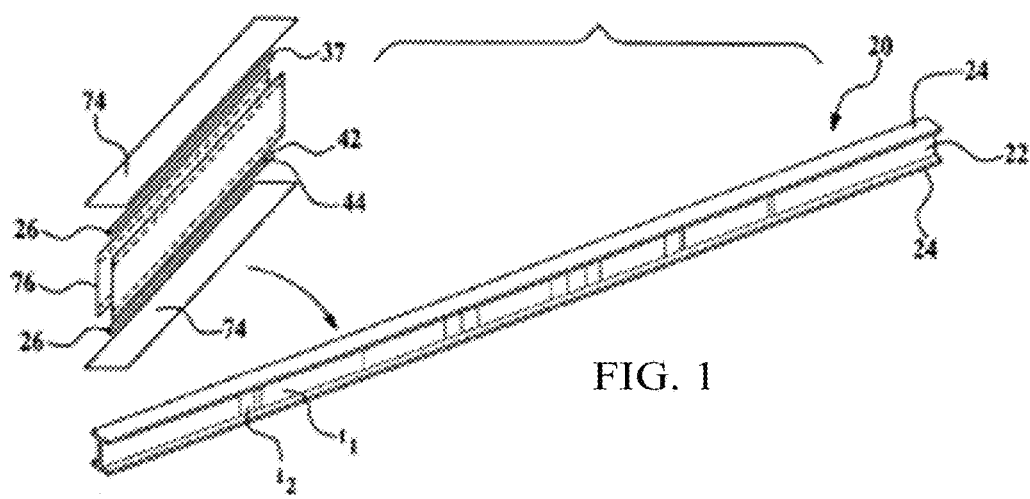
FIG. 1 is an exploded view and perspective view of a thermoplastic composite laminate formed in accordance with the disclosed embodiments.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. Although sheet stack 76 is shown as comprising 2 plies, it is to be understood that either of the sheet stacks 74 and 76 may include any number of plies, depending on the application. It will also be understood that cap regions 24, which are shown in FIG. 1 as having a uniform thickness and one ply, may similarly be provided with regions of varying thicknesses and/or a plurality of plies. Furthermore, while the cross sectional shape of the floor beam 20 shown in FIG. 1 is substantially constant along its length, the cross sectional shape may vary at a constant or non-constant rate along the length of the beam 20, as will be discussed later in more detail.

In alternative versions (not shown), a thermoplastic composite laminate such as the floor beam 20 may alternatively be formed by consolidating one or more uniform or non-uniform tacked multi-layer ply sheets 74,76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 36 and preformed filler nuggets 26 each retained on roller 46 or other retention devices.

Next, in Step 160, multiple plies 32, 34 of the thermoplastic materials 36 are stacked in a desired configuration to form either a non-uniform thickness or uniform thickness untacked multi-layer ply sheet stack 58 or 60 using either a hand lay-up or automated process.

Figure 2:
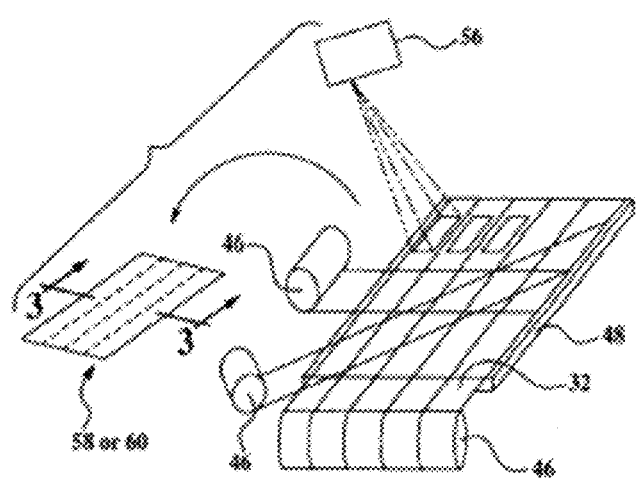
FIG. 2 is a perspective view of a conveyor table used to form a tailored multiplayer stack.

In the automated process, as shown in FIG. 2, a plurality of plies 32 or 34 (FIG. 3) of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end 50, or along the sides 52, 54 of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

Figure 3:
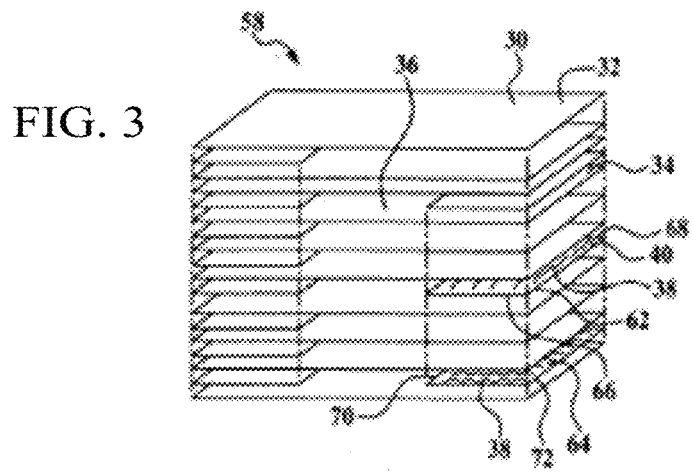
FIG. 3 is a perspective view of one example of a tailored multi-layer stack formed in FIG. 2.

An example of an untacked, non-uniform thickness multi-layer sheet stack 58 made according to the process of FIG. 2 is shown in FIG. 3, which shows various full and partial plies 32, 34 and further showing pockets 36 created between plies 32, 34. Moreover, FIG. 3 shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle therebetween (including, for example a 0/30 orientation, a 0/60, 0, 45, 90 orientation etc.).

Next, in Step 170, some or all of various plies 32, 34 of the untacked stacks 58, 60 formed in FIG. 2 may be tacked together at various predetermined locations to form either a uniform or non-uniform thickness tacked multi-layer ply sheet stack 74, 76. Preferably, the stacks 58, 60 are tacked together using a soldering iron or ultrasonic welder (not shown) to form the respective stack 74, 76, although other devices used to couple together various plies 32, 34 of thermoplastic materials known to those of ordinary skill are also specifically contemplated. The amount and location of tacking among the plies 32, 34 is dependent upon numerous factors, including but not limited to the number and location of the various plies 32, 34 and pockets formed by possible partial plies 64. Moreover, the amount of tacking should be sufficient to form a substantially integrated tacked stack 74, 76 that can be transported as a single part.

In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation structure 78 to form a single integrated thermoplastic composite laminate such as floor beam 20. One preferred consolidation structure 78 specifically designed to form the thermoplastic composite laminate floor beam 20 of FIG. 1 is illustrated in FIGS. 4 and 5, and is sometimes referred to as a continuous compression molding ("CCM") machine.

Figure 4:
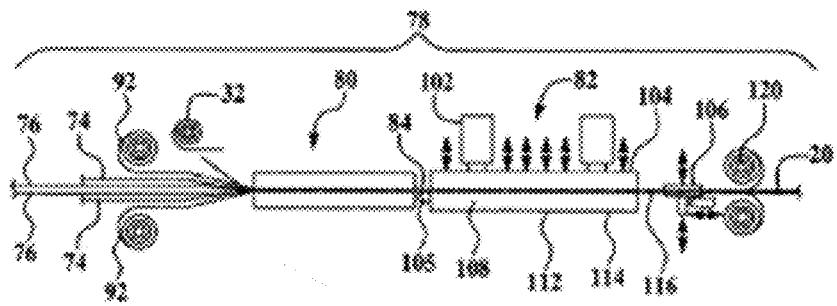
FIG. 4 is a view of a pre-forming zone and a consolidating zone of a consolidation structure used to form the thermoplastic composite laminate of FIG. 1.
Figure 5:
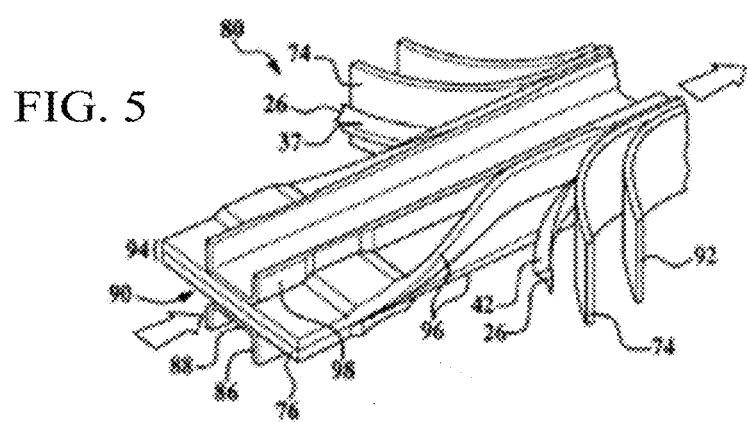
FIG. 5 is a perspective view of the pre-forming zone of the consolidation structure of FIG. 4.
Figure 6:
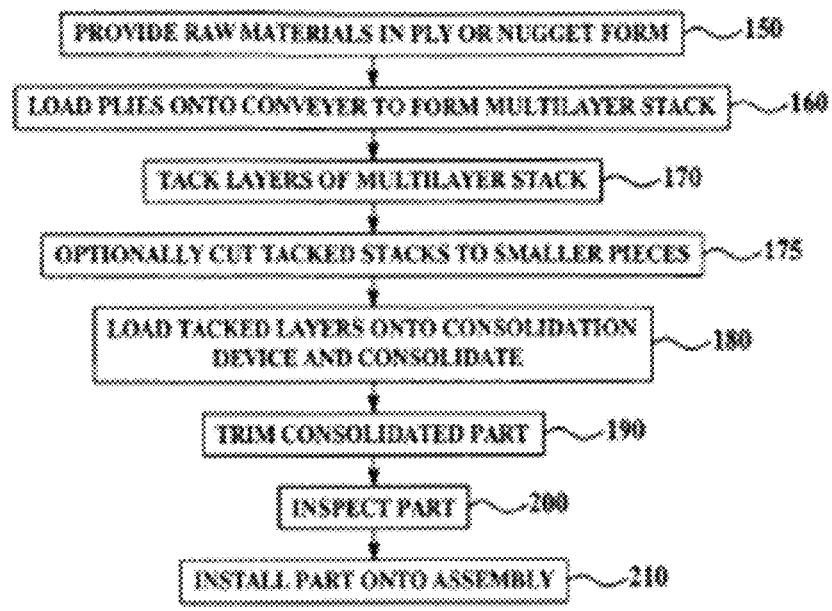
FIG. 6 is a logic flow diagram describing the preferred method for forming the thermoplastic composite laminate of FIG. 1 in accordance with FIGS. 2-5.
Figure 7A:
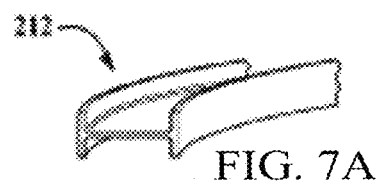
FIGS. 7a-7f are perspective views representing examples of curved, thermoplastic composite laminate parts formed in accordance with the disclosed method.
Figure 7B:
Figure 7C:
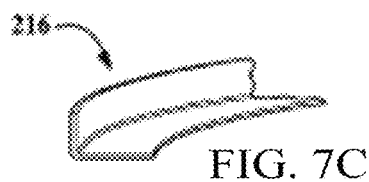
Figure 7D:
Figure 7E:
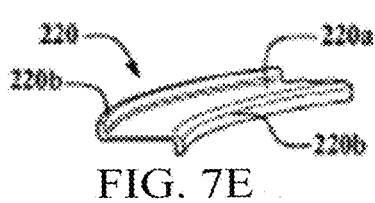
Figure 7F:
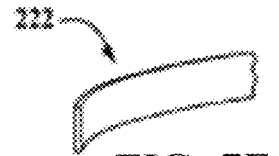

Referring now to FIGS. 4 and 5, the consolidation structure 78 may include a pre-forming zone 80 and a consolidation zone 82. In the performing zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32, FIGS. 2 and 3, of thermoplastic material are loaded in their proper orientations in a continuous process and preformed to the desired shape at an elevated temperature to form the pre-formed part 84. The preformed part 84 then exits the performing zone 80 and enters the consolidation zone 82, wherein it is consolidated to form a single, integrated thermoplastic composite laminate such as floor beam 20 as described in FIG. 1 above. The elevated temperature used in performing the part should be sufficiently high to cause softening of the tacked stacks 74, 76 or the single ply 32 so that the layers may be bent during the performing process. However, the elevated temperature should be below a temperature at which the polymeric component of the matrix resin 40, 42 has the consistency of a viscous liquid.

Referring now to FIG. 5, the pre-forming zone 80 of the consolidation structure 78 includes a pair of U-shaped tooling channels 86 having a central portion 88 separated by a gap 90 and a pair of sidetooling sheet members 92. Sheet members 92 may also be called mandrels 92. Preferably, the channels 86 and side-tooling sheet members 92 are formed of materials such as stainless steel and the like, that are capable of handling repetitious, high-heat cycles.

A first pair 94 of tacked stacks 74 or 76 is introduced between the respective central portions 88 and within the gap 90 of the U-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced within the gap 90. The uniform thickness tacked stack 74 is shown being introduced at a position between the outer portion 98 of the U-shaped channels 86 and respective side-tooling member 92. Further, the ply layer 32 is not depicted in this description. While not shown, the U-shaped channels 86 include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move through the performing zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the U-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but is below the temperature in which the polymeric component of the matrix resin 40, 42 of the respective stacks 74, 76 and nuggets 26 has the consistency of a viscous liquid. Bending of the flanges 96 is initiated by pressure applied to the flange 96 by external forming devices such as rollers (not shown). The side-tooling sheet members 92 squeeze the tacked stack 74 inwardly against the flange 96, causing additional pressure to be applied to the flange 96 which aids in bending the flange 96. The preformed part 84 is then ready to move to the consolidation zone 82.

Figure 16:
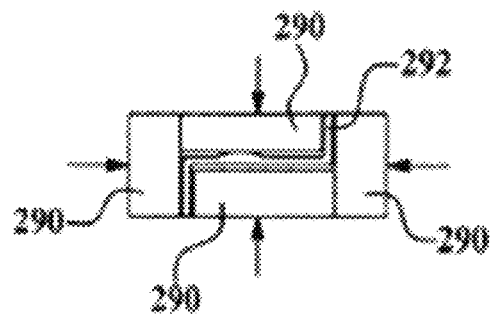
FIG. 16 is a sectional view through the press, showing the dies compressing the preformed part using the consolidation tooling.

As best shown in FIG. 4, the preformed part 84 enters a separate or connected consolidating structure 102 within consolidation zone 82 on guide roller 105. The consolidating structure 102 includes a plurality of standardized tooling dies generally indicated at 104 that are individually mated with the outer surfaces of the U-shaped channels 86 and side-tooling sheet members 92. Additional details of the tooling dies 104 will be discussed later with reference to FIGS. 13 and 16. This commonality of the surfaces between the standardized dies 104 of the consolidating structure 102 and the outer surfaces of the channels 86 and sheet members 92 eliminates the need for part-specific, costly matched dies as well as eliminates start up times between different preformed parts having different ply configurations.

The consolidating structure 102 has a pulsating structure 106 that incrementally moves the preformed part 84 forward within the consolidation zone 82 and away from the pre-forming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20.

Each die 104 is formed having a plurality of different temperature zones with insulators. The dies 104 do not actually contact the part 84, but contact the outer surfaces of the U-shaped channels 86 and sidetooling sheet members 92 opposite the part 84. Thus, the respective inner surfaces of the channels 86, and sheet members 92 compress against the portion of the part 84. The compression may occur wherein all of the dies 104 compress in one independent yet coordinated step. The dies 104 are opened, and the part 84 is advanced within the consolidating zone 102 away from the pre-forming zone 80. The dies 104 are then closed again, allowing a portion of the part 84 to be compressed under force within a different temperature zone. The process is repeated for each temperature zone of the die 104 as the part 84 is incrementally advanced along the guide rollers 105 towards the cooling zone 114.

The formed and shaped part 84 then enters a cooling zone 114, which is separated from the pressing zone 112, wherein the temperature is brought below the free flowing temperature of the matrix resin 40, 42, thereby causing the fused or consolidated part to harden to its ultimate pressed shape 116. The pressed part 116 then exits the consolidating structure 102, wherein the side sheet members 92 are re-rolled onto rollers 120 as scrap.

While not shown, the consolidating structure 102 may have additional parts or devices that can introduce shapes or features into the pressed shape 116.

One preferred consolidating zone structure 102 that may be utilized is the so-called continuous compression molding (CCM) process as described in German Patent Application Publication No. 4017978, published on Sep. 30, 1993, and herein incorporated by reference. However, other molding processes known to those of ordinary skill in the art are specifically contemplated by the embodiments, including but not limited to pultrusion or roll forming.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While the embodiments are described in terms of forming a thermoplastic composite floor beam 20 having essentially an I-beam shape, other potential shapes are specifically contemplated. This includes thermoplastic composite laminates having an L-shape, a C-shape, a T-shape, or even a flat panel shape in which tapers or thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein. Further, one or more filler nuggets 26 may also be used to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the U-shaped channel 86 of FIG. 5 is specific for forming I-beams such as floor beam 20 of FIG. 1, an alternatively shaped tool having gaps 90 is used in forming C-shaped laminates, L-shaped laminates or flat beams having a taper between respective ply layers. Similar to the U-shaped channel 86, these alternative tools include regions not contacting the stacks 74, 76 that are matched to the standardized dies 104 within the consolidating zone 102.

While the embodiments are well suited for forming thermoplastic composite laminates, by using a modified single-step consolidation zone, thermosetting laminate composites can also be formed. In this modified version of the consolidation process, the heating and pressing zones achieve a temperature above the reaction or curing temperature of the matrix resin to form a thermosetting part. Accordingly, the single pressing process achieves a part having its ultimate desired shape without subsequent pressing steps.

The embodiments provide a method and apparatus to fabricate complex thermoplastic tapered composite laminates that may have tailored and varying thickness, and/or curvatures in a continuous process. This innovative process utilizes automated equipment or hand lay-up to collate parts or components into a multi-layer stack. Each stack contains all plies, including ply build-up areas, tacked in the proper location to maintain orientation and location. The consolidation structure utilizes a two-stage method for forming the composite laminates from the multi-layer stacks and contains all necessary part features to achieve this result. The tooling, such as the U-shaped channel or tool 86 in the pre-forming zone 80 is created with an appropriate shape to create the desired thickness variations in the formed TPC laminates 20 and is further designed to mate with standardized dies with the consolidation zone 82

The composite part formed by the above method may find use in a wide variety of applications, including, for example, automotive and aerospace applications. One example of a composite part formed in accordance with the embodiments is ideally suited for use as structural stiffened members, including thermoplastic composite laminate floor beams 20, in a commercial aircraft.

Referring now to FIGS. 7-15, an alternate embodiment may be used to manufacture thermoplastic laminate parts that are both curved and have tailored and/or varying thickness along their length. Further, as will be discussed later, the cross sectional shape of these parts may vary along the length of the part, resulting in one of more longitudinal tapers in the part. Curved laminates can be produced in which the curvature is either constant (circular) or variable along the length of the laminate part. Also, the longitudinal taper may be constant or may vary along the length of the part. As in the case of the embodiment previously described, the curved thermoplastic laminate part may include tailored areas and areas of varying thickness achieved by adding partial or local plies, or areas containing pockets. "Tailored" or "tailoring" refers to the profile of the part surface, wherein the selective addition or reduction of plies in specific areas of the part can be used to achieve a desired surface profile after the plies are consolidated during the compaction process. Curved parts produced by this embodiment of the method may be used in a variety of applications such as frames, rings, formers and structural aircraft stiffened members or fuselage skins, wing skins, door panels and access panels, keel beams, floor beams, and deck beams. The curved parts can be produced with a variety of cross sections, such as those shown in FIGS. 7a-7f. A fabricated part 212 having an I-section is shown in FIG. 7a while a part 214 having a U-section is shown in FIG. 7b. An L-section part 216 is shown in FIG. 7c and a T-section part is shown in FIG. 7d. A part 220 having a Z-section as shown in FIG. 7e and a part 222 having a simple rectangular section is shown in FIG. 7f. The parts shown in FIGS. 7a-7f may have either constant or variable curvature as previously mentioned, and may include areas of varying or tailored thickness at one or more points along their lengths, as well as one or more longitudinal tapers.

Figure 8:
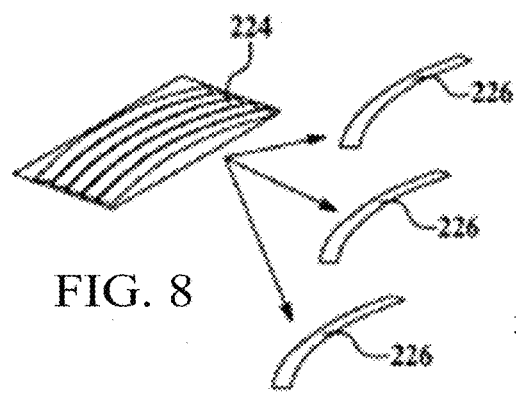
FIG. 8 is a perspective view of a tailored, multilayer stack of thermoplastic composite material, with three curved part blanks cut from the stack.

The preliminary steps in fabricating curved thermoplastic laminate parts in accordance with this embodiment of the method are similar to those previously described. A plurality of plies of thermoplastic material are deposited onto a conveyor table to form a collated, multi-layer non-uniform thickness or uniform thickness multi-ply stack, as previously described in connection with FIG. 2. The resulting, multi-layer stack is thus similar to the stack 58 shown in FIG. 3 which includes full and partial plies 32, 34 as well as pockets 36 created between plies 32, 34. Partial plies 62, 64 may also be included which have unidirectional fibers 38 arranged at alternating angles relative to the direction of orientation of the fibers. As previously described, the sheets in the multi-layer stack 58 are tacked together using a soldering iron or other heating device (not shown) so that the plies are held in fixed relationship to each other. A collated, tacked stack 224 produced by the method previously described is shown in FIG. 8.

The next step in the method for producing the curved composite parts comprises cutting individual part ply stacks or part blanks 226 from the collated stack 224. This cutting operation may be performed, for example, by a water jet cutter (not shown) operating under computer control which produces cut blanks 226 having an outer profile generally corresponding to the desired part curvature. As previously indicated, this curvature may be constant or may vary along the length of the part blank 226.

The part blanks 226 are fed along with a later described set of consolidation tooling 235 to a pre-forming station 275 (FIGS. 14 and 15) in a manner generally similar to that described previously with respect to producing non-curved composite parts. In the case of the present embodiment however, the consolidation tooling 235 and the blanks 226 move through a curved path as they are fed into the pre-forming station 275.

Figure 9:
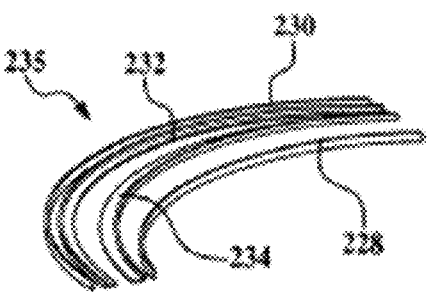
FIG. 9 is a perspective view of tooling used to form the curved thermoplastic composite parts in accordance with the disclosed method.

The consolidation tooling 235 is shown in FIG. 9 and comprises curved inner and outer tooling sleeves 228, 230 as well as upper and lower tooling sleeves 232, 234. The upper and lower tooling sleeves 232, 234 each possess a curvature corresponding to that of the blanks 226, while the inner and outer tooling sleeves 228, 230 may be either similarly curved, or flexible so as to conform to the curvature of the part blank 226 during the pre-forming process. In the example illustrated in FIGS. 9, 14 and 15, the tooling sleeves 228-234 are configured to produce the Z-section part 220 shown in FIG. 7e. Although not specifically shown in the drawings, the part-side surfaces of the tooling sleeves 228-234 contain tooling features that produce mirror image features in the part, such as varying thicknesses, varying curvature, pockets, etc.

Figure 14:
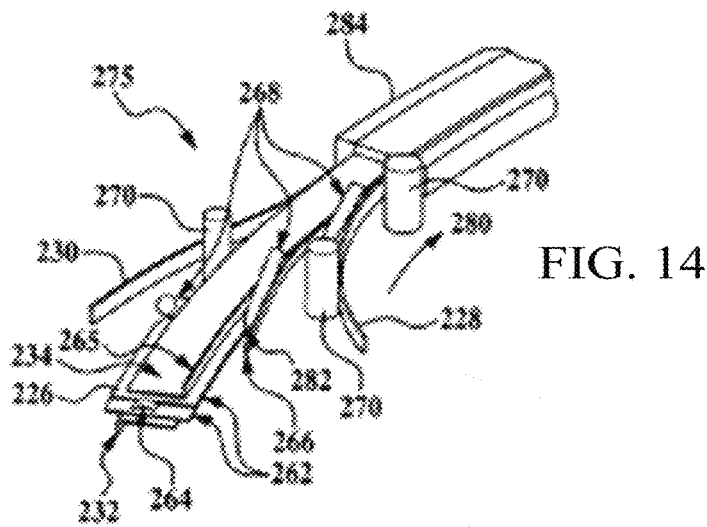
FIG. 14 is a perspective view of a pre-forming structure and a portion of a compaction press used in the method to produce curved composite parts.
Figure 15:
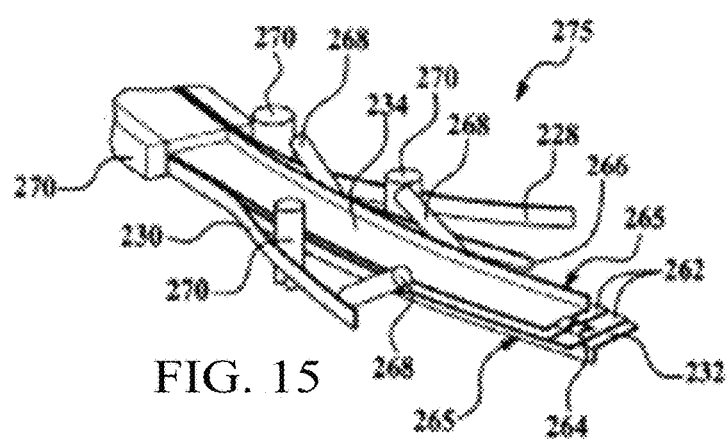
FIG. 15 is a view similar to FIG. 14 but showing the opposite side of the pre-forming structure and press.

Referring now particularly to FIGS. 14 and 15, the upper and lower tooling sleeves 232, 234 are assembled around the part blank 226 before the blank is fed in a curved path 280 into the pre-forming station 275 which includes a plurality of forming devices 268 and a set of guides 270. The part blank 226 can be seen to include a flat tacked stack 262 that comprises the web 220a and cap 220b (FIG. 7e) of the Z-section part 220, and a set of buildup plies 264 which form a local reinforcement of the beam web 220a.

As the sandwiched assembly comprising the part blank 226 and the tooling sleeves 232, 234 is fed into pre-forming station 275, the inner and outer tooling sleeves 228, 230 are fed into contact with the sandwiched assembly. Forming devices 268 function to deform edge portions of a blank 226 against flanges 265 on tooling sleeves 232, 234, thereby pre-forming the caps 220b of the Z-section part 220. Simultaneously, additional cap reinforcement plies 266 are fed between the forming devices 268 and the tooling flange 265. Guides 270 bring the inner and outer tooling sleeves 228, 230 into contact with the edges of the blank 226 which form the caps 220b. The preformed blank 226 along with the consolidation tooling 235 continue their movement in the curve path 280 through a curved press 284 such as a CCM machine 78 (FIG. 4 which contains dies that impose force on the consolidation tooling 235. This force results in compaction and consolidation of the plies of the preformed part. Although not specifically shown in the drawings, heaters or ovens are provided as necessary to heat the part blank 226 to a temperature at which the polymeric component of the matrix resin in the part blank 226 has the consistency of a viscous liquid. Heating of the part blank 226 in this manner facilitates ply consolidation. In some cases, pre-heating of the part blank 226 may also be required to facilitate the pre-forming process. The need for pre-heating of the part blank 226 can depend on a number of factors, such as the number of plies, ply orientation, the type of material, the shape being preformed, etc.

Figure 17:
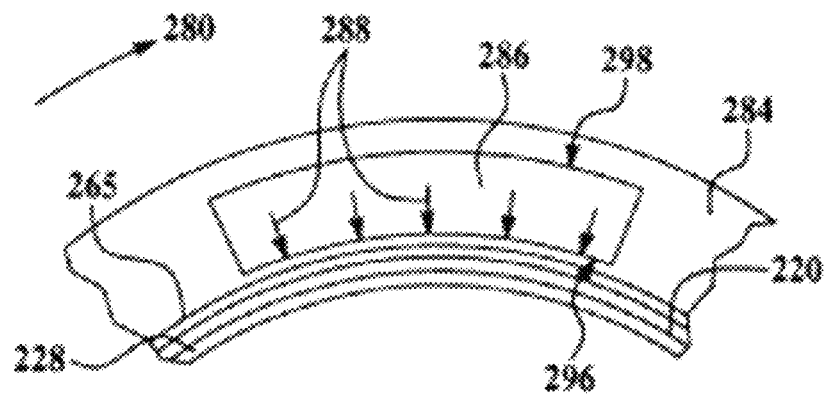
FIG. 17 is a fragmentary view of a section of the press, showing a curved die in relation to tooling sleeves for producing a part having a constant curvature.

The press 284 is essentially similar to that previously described in connection with FIG. 4. However unlike the press shown in FIG. 4, the dies used in press 284 will comprise some degree of curvature to accommodate the curved, preformed part 226. One such die 286 is shown in FIG. 17, where it can be seen that the inner face 296 of the die 286 has a curvature that matches the curvature of the flange 265 on the upper tooling sleeve 232. Die 286 moves inwardly in the direction of the arrows 288, into contact with the flange 265 during the compaction process, and in opposition to another curved die (not shown) which moves into contact with the inner tooling sleeve 228. The amount of curvature of the dies used in press 284 will depend, in part, on the shape of the curved part being produced and the shape of the tooling sleeves necessary for fabrication of the features in the part. The outer face 298 of the die 286 may be curved as shown in the FIG. 17, or may be flat. The preformed part is moved in the curved path 280, incrementally through the press 284. As the part movement is paused at each incremental step, the press dies impose heat and force on the tooling sleeves 235, resulting in consolidation of a section of the plies that lie beneath the dies.

Figure 18:
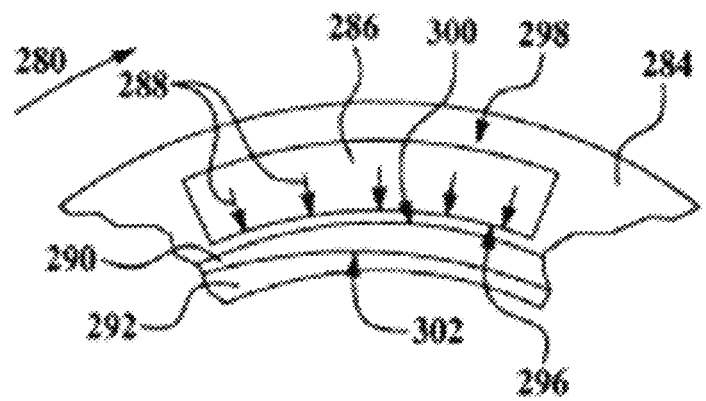
FIG. 18 is view similar to FIG. 17 but showing tooling sleeves for producing a part having a non-uniform curvature.

As previously indicated, the laminated part may have a varying, rather than a constant curvature, along its length, and in this connection attention is directed to FIG. 18. A die 286 used to compact a curved preformed part 292 has a constant curved inner face 296 which engages the outer face 300 of a tooling sleeve 290. The outer face 300 of tooling sleeve 290 has a constant curvature, matching the curvature of the inner face 296 of the die 286, but has an inner face 302 that is curved with a radius different than that of the outer face 300 of the tooling sleeve 290, resulting in a part 292 having a non-constant outer radius.

Figure 10:
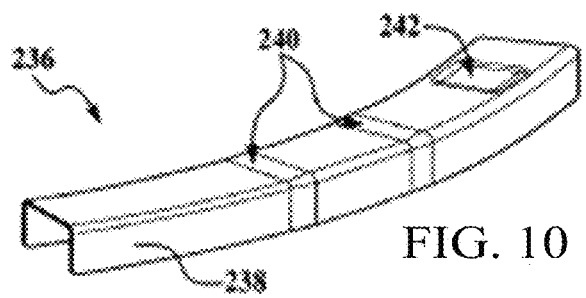
FIG. 10 is a perspective view of a curved tool used to impart features to the curved thermoplastic composite part.
Figure 11:
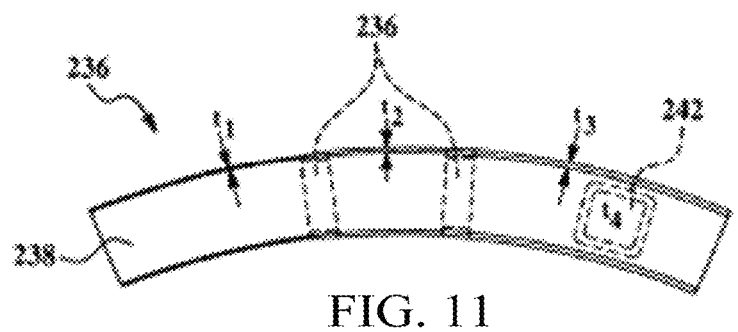
FIG. 11 is a bottom view of the tool shown in FIG. 10.

Another example of a curved thermoplastic laminate part 236 is shown in FIGS. 10 and 11 wherein the part has curvature over its length and has a body 238 which is U-shaped in cross section. The body 238 has a pair of sloped ramps 240 which form transitions in the thickness of the body 238 so that the part 236 has 3 sections of different thicknesses along its length. In addition, the top side of the body 238 is provided with a pocket or depression 242 representing an area of reduced thickness in the part 236. The differing thicknesses of the body 238 are represented by $t_1$, $t_2$, $t_3$, while the thickness of the pocket 244 is represented by $t_4$. Although part 236 possesses constant inner and outer curvatures, it is to be understood that the curvature may vary along the length of the part 236.

Figure 12:
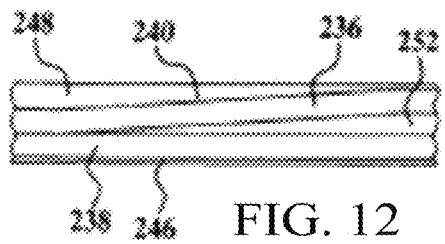
FIG. 12 is a fragmentary, cross sectional view showing a portion of a curve composite part captured between two portions of a tool.

FIG. 12 shows a portion of the part 236 held within tooling sleeves 246, 248 for consolidating the part plies. The part plies 236 can be seen to have a ply buildup area 252 which effectively increases the thickness of the body 238, and results in the slope 240. The tooling sleeves include a release coated metal shim 246 and an outer consolidation tool portion 248 having a ramp for forming the slope 240. As viewed in FIG. 12, the top side of the tooling sleeve 248 is flat so as to be engageable with a universal die, such as any of the dies 256 shown in FIG. 13.

Figure 13:
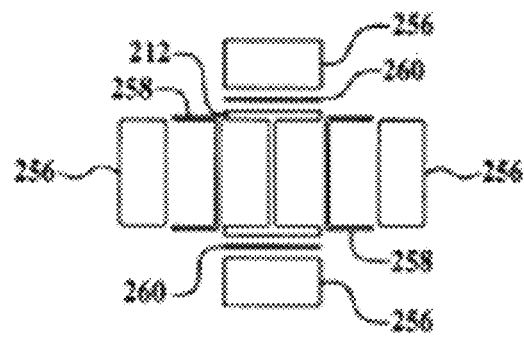
FIG. 13 is an exploded, cross sectional view of a thermoplastic composite I-section beam, shown in operative relationship to tooling and machine press dies used to compact the laminate plies.

FIG. 13 shows another example of a curved part 212 fabricated in accordance with the disclosed embodiments. Part 212 comprises a curved beam having an I-shaped cross section. Conventional machine dies 256 can be used to consolidate parts that have both curvature and varying thickness along their length. In this example, the tooling sleeves comprises a pair of flat metal sheets or shims 260 and a pair of tooling sleeves 258 that are generally U-shaped in cross section. The flat sheets 260 assist in forming the caps of the part 212 while sleeves 258 function to form portions of the cap as well as the web of the part 212. The faces of the sleeves 258 that face the part 212 may have tooling features such as raised areas or ramps that impart mirror image features onto the part 212. Although not specifically shown in FIG. 13, the sheets 260 and tooling sleeves 258 may be curved along their length in order to form a part 212 that is also curved.

Figure 19:
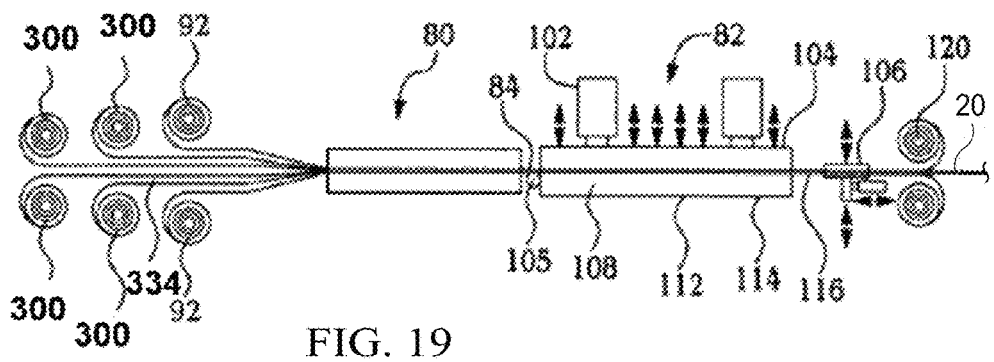
FIG. 19 is an illustration similar to FIG. 4 but showing the use of spools to continuously feed plies of thermoplastic material into the pre-forming zone of the consolidation structure.

Referring now to FIG. 19, a method is provided for the continuous fabrication of thermoplastic composite laminate parts using flat sheets 334 of pre-plied thermoplastic material that is continuously fed into the pre-forming zone 80 from one or more spools 300. Each of the sheets 334 may comprise one or more plies, any or all of which may be reinforced with fibers, such as carbon fibers, for example. The number of spools 300 will depend upon the particular application and the geometry of the part; however the continuously formed part may typically comprise multiple laminated plies of thermoplastic material. The thermoplastic material forming the sheets 334 may comprise any of the thermoplastic materials 30 previously described in reference to FIG. 1. Side tooling sheets 92 or "mandrels" may be fed along with the sheets 334 into the pre-forming zone 80.

Although not specifically shown in FIG. 19, additional materials such as filler nuggets may be fed along with the sheets 334 in order to form specific features of the part. As will be discussed below, the plies forming each of the sheets 334 supplied by each spool 300 may include fibers aligned at differing angles relative to a reference direction of orientation in order to increase the strength and rigidity of the fabricated part. The arrangement shown in FIG. 19 is well suited for continuously fabricating relatively simple parts such as flat beams and beams having an "L" shaped cross section, for example.

Figure 20:
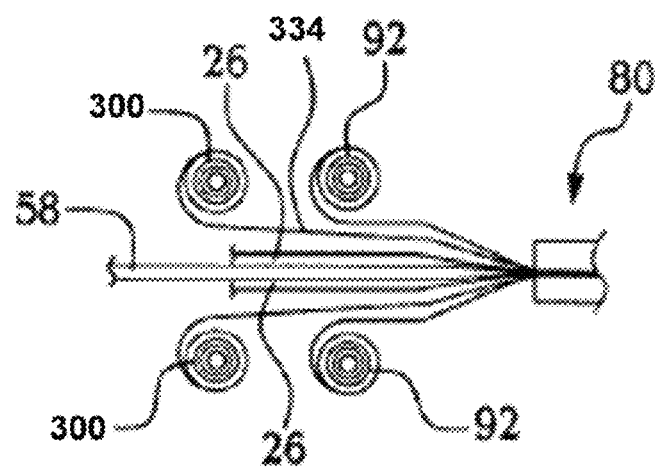
FIG. 20 is a fragmentary illustration showing a pre-formed stack of plies being fed to the pre-forming zone along with plies continuously fed from spools.

As shown in FIG. 20, sheets 334 from spools 300 may be continuously fed into the pre-forming zone 80 along with the previously described multi-layer stack 58 and filler nuggets 26. The multi-layer stack 58 may or may not include tailored thicknesses, pockets or curvatures along its length.

In some cases, it may be desirable to integrate one or more metal fittings into any of the TPC laminate structures described above, including those that have curvature along the length and/or tailored or varying laminate thickness. Potential applications of TPC laminate structures having integrated metal fittings includes beams, stanchions, frames, rings, formers, skins and other structural stiffening members. In accordance with embodiments of the disclosure, metal fittings can be integrated into the previously described TPC laminate structures as part of a continuous process for fabricating these structures, as previously discussed.

Figure 21:
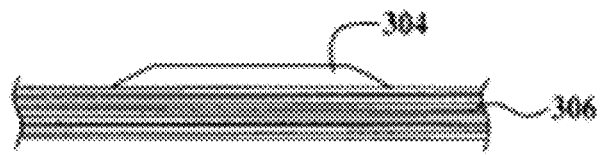
FIGS. 21-25 are cross sectional illustrations of various joints formed between a thermoplastic composite laminate and a metal fitting.

Referring now to FIGS. 21-25, a metal part or fitting such as the metal fitting 304 shown in FIG. 21 may be bonded and integrally formed with a TPC laminate structure 306 according to a method which will be discussed below in more detail. The TPC composite material in structure 306 may comprise, for example without limitation, AS4D/PEKK. The metal fitting 304 may be formed from any suitable material, depending upon the application such as, without limitation, aluminum or titanium. The metal fitting 304 may have any of various geometries and features depending on the application and purpose of the fitting 304. In the case of the application shown in FIG. 21, the metal fitting at 304 acts as a "doubler" which reinforces a location section of the TPC laminate structure 306.

Figure 22:
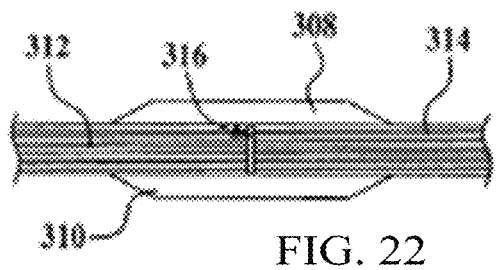

FIG. 22 illustrates a double lap splice 316 between two TPC laminates 312, 314. A pair of metal fittings 308, 310 are integrally bonded to opposite sides of laminates 312, 314, overlying the splice joints 316.

Figure 23:
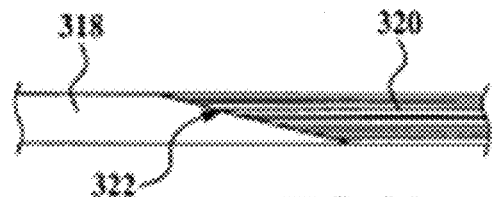

FIG. 23 illustrates the use of a scarf joint 322 between a TPC laminate 320 and a metal fitting 318.

Figure 24:
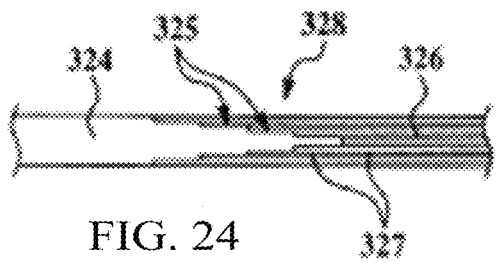

FIG. 24 illustrates a stepped lap joint 328 between a metal fitting 324 and a TPC laminate 326. The metal fitting 324 includes a series of symmetrical steps 325 along one edge thereof, which complementally receive one or more individual plies 327 of the laminate 326.

Figure 25:
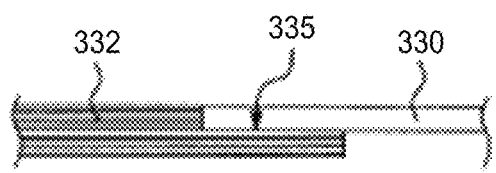

FIG. 25 illustrates a rabbet joint 335 formed between a metal fitting 330 and a TPC laminate 332.

The joints illustrated in FIGS. 21-25 are merely representative of a wide range of joint constructions and geometries that may be used in carrying out the embodiments of the disclosure.

Figure 26:
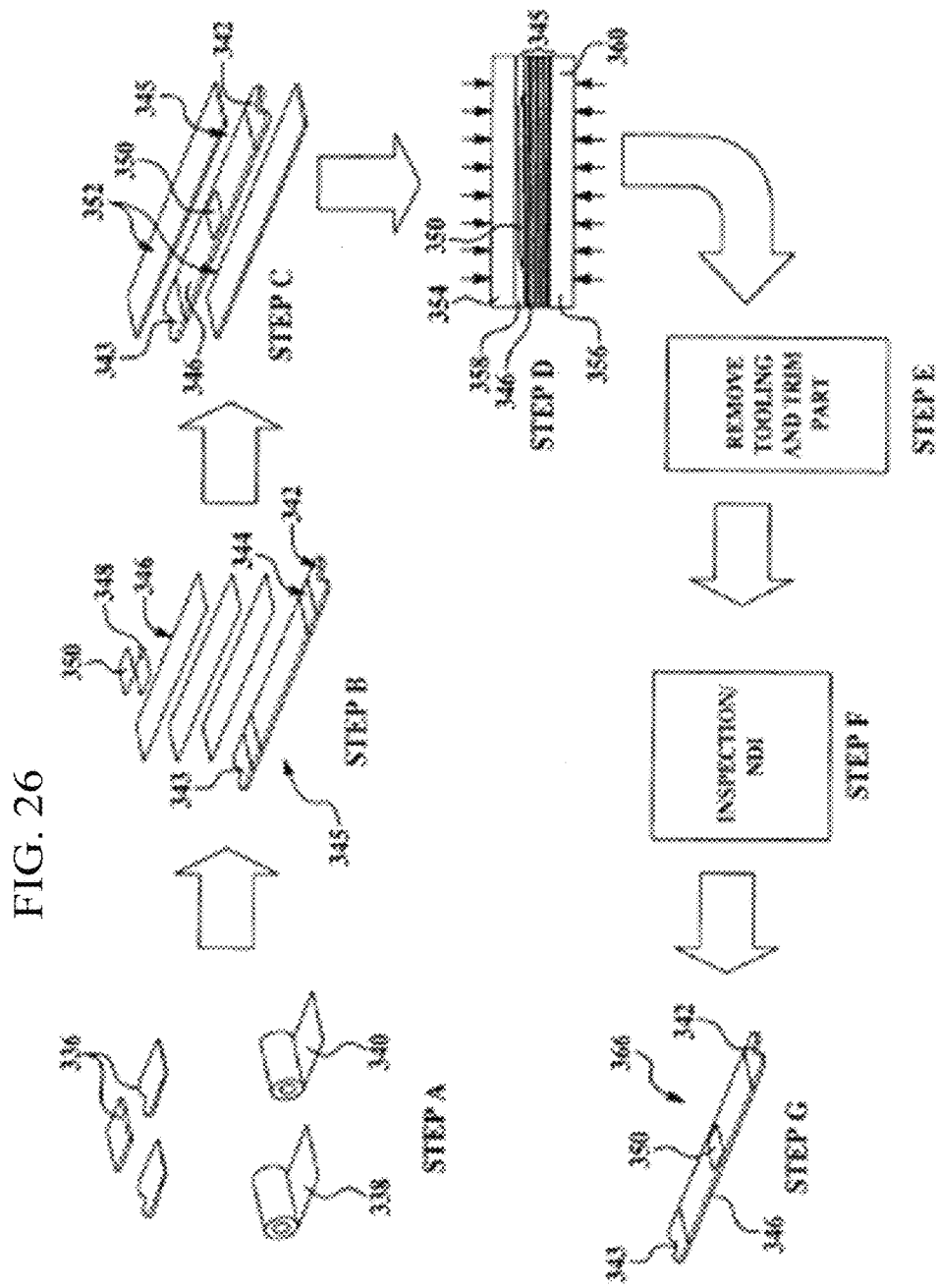
FIG. 26 is a diagrammatic illustration of the steps used in a method for fabricating thermoplastic composite laminates having integrated metal fittings according to an embodiment of the disclosure.
Figure 27:
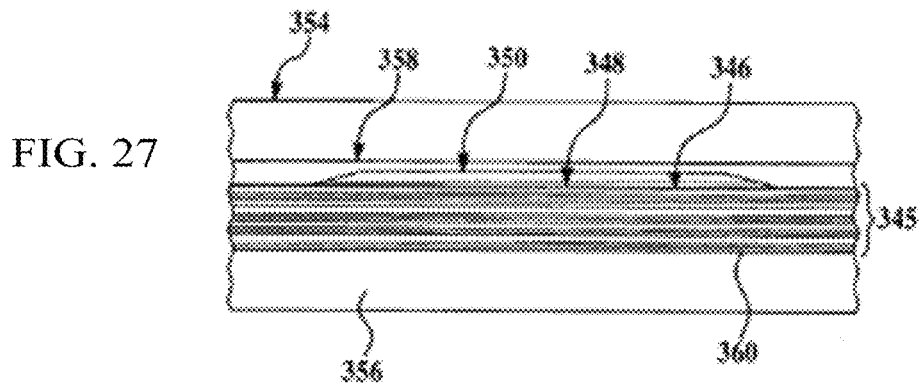
FIG. 27 is a cross sectional illustration of a laminate structure having an integrated metal fitting positioned between consolidation tooling.
Figure 28:
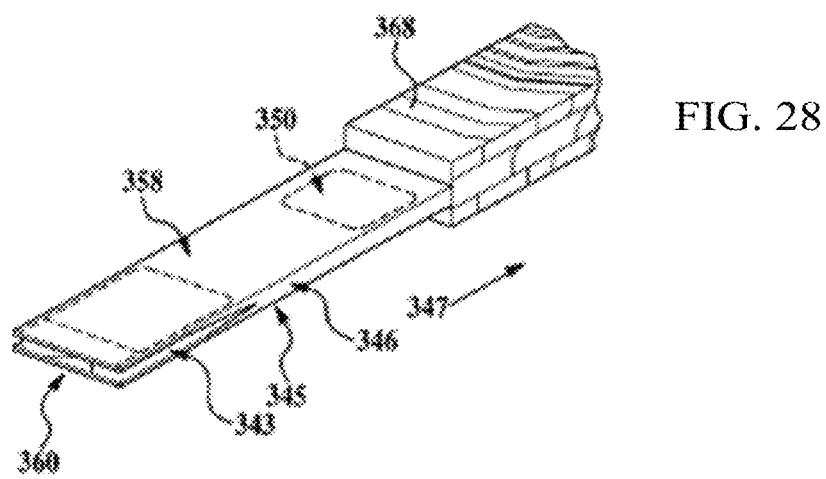
FIG. 28 is a perspective illustration showing a lay-up and consolidation tooling being fed to a continuous compression molding machine.

Referring now to FIGS. 26-28, a method continuously fabricating TPC laminate structures or parts having integrated metal fittings begins with the provision of raw materials and parts, shown in FIG. 26 as "Step A". The materials include a fiber reinforced composite material 338 with PEKK (Polyetherketoneketone) as the matrix resin (or other TPC composite material), PEKK film 340 and metal fittings 336. The reinforced composite material 338 may be in unidirectional or fabric prepreg forms. The metal fittings 336 may be machined from titanium or other suitable metals. The fittings 336 are cleaned and a high temperature bonding primer is applied to the bonding surfaces on the fittings 336. Additional components (not shown), such as the filler nuggets 26 (FIG. 5) used in manufacturing the I-beam shown in FIG. 1, are extruded or molded into discrete lengths.

Next, at "Step B", a lay-up 345 is prepared, comprising metal fittings 342, 343, 350, multiple TPC plies 346, and layers 344, 348 of PEKK film. A layer 340 of the PEKK film is applied to the primed bonding surfaces of the metal fittings 342, 343 and 350. Depending upon the type of joint and the particular application, an automated process or hand lay-up may be used to create customized stacks comprising multiple plies 346 of the reinforced composite materials from the supply of material 338, which may be in spool form. The automated process, which has been previously described, produces material blanks for multiple parts or components for a wide variety of lay-up configurations. The plies 336 in the stack may be tacked together in multiple locations using a heating or ultrasonic welding device as previously described. In the particular embodiment shown in FIG. 25, fittings 342, 343 are joined to the ends of the stack of plies 346 using any of the joints shown in FIGS. 21-25 (or other joint configurations), and the metal fitting 350 is positioned on top of the plies 346 and acts as a doubler in the finished part.

The lay-up 345 is positioned between consolidation tools 352 of the type previously mentioned, as shown in "Step C" in FIG. 26. The consolidation tools 352 may include surface features that are transferred to the laminate plies 346 in order to create thickness tailoring, thickness variations and curvatures or other part features. These part features may include pockets to accommodate features of the fittings 342, 343 and 350, as well as ply buildup ramps, part curvatures, etc. The sides of the tool 352 which mate with a CCM machine 368 is of a constant size and shape to match standard dies on the CCM machine 368. The locations of the features on the tools 352 are coordinated with the features of the stack of plies 346. Thin steel sheets (not shown) of the type previously described, may be used on the non-tool side of the laid-up plies 346.

"Step D" in FIG. 26, and FIG. 27 better illustrate the relationship between the tools 352 and the lay-up 345. The consolidation tools 352 include tool members 358, 360 engaging opposite sides of the lay-up 345. The tool members 358, 360 are engaged by press platens 354, 356 which squeeze the tool members 358, 360 together in order to consolidate the plies 346 of the lay-up 345. One of the tools 358 includes a pocket having a shape matching that of the doubler fitting 350. The second tool member 360 is smooth on both of its opposite faces.

As shown in FIG. 28, the lay-up 345 is fed along with the tool members 358, 360 into the CCM machine 368, in the direction of the arrow 347. Although not specifically shown in FIG. 28, the lay-up 345 along with the consolidation tool members 358, 360 may pass through a pre-forming station such as that shown in FIG. 5, where the lay-up 345 is preformed into the approximate shape of the final part 366.

The CCM machine 368 consolidates the lay-up 345, including fittings 342, 343, 350, into a solid, monolithic part. The lay-up 345 and consolidation tooling 352, are continuously moved, incrementally through the CCM machine 368 so that press platens 354, 356 apply pressure to successive sections of the tooling 352 as the lay-up 345 is moved each incremental step. It should be noted here that other consolidation processes may be used, such as those employing heated presses (not shown).

Referring again to FIG. 26, at "Step E" following consolidation, the tooling 352 is removed from the consolidated part 366 and the part 366 is trimmed. At step "F", the part 366 is inspected, using nondestructive inspection techniques. The final part 366 shown in "Step G" is a monolithic, fully consolidated structure in which the metal fittings 342, 343 and 350 are formed integral with the consolidated plies 346 of the TPC laminate.

Figure 29:
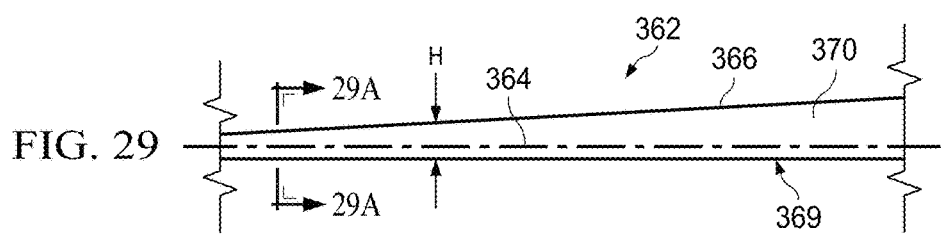
FIG. 29 is an illustration of a side view of a stiffener having a tapered feature along its length.
Figure 29A:
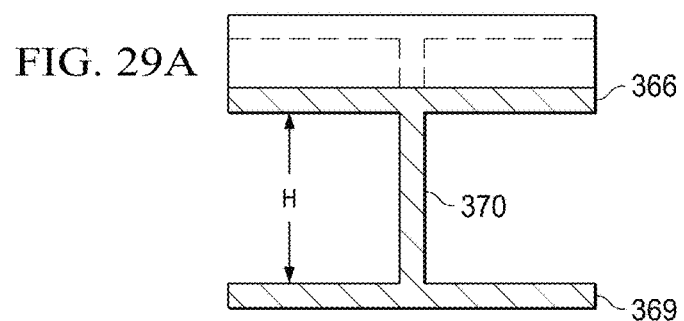
FIG. 29A is an illustration of a sectional view taken along the line 29A-29A in FIG. 29.

As previously discussed, continuous compression molding techniques may be used to fabricate fiber reinforced polymer stiffeners, for example, using polymers resins discussed above including, for instance, thermoplastic matrix polymers, for instance, as shown as 40 in FIG. 3, and combinations thereof having constant or variable geometries, including a constant or variable thickness and/or one or more curvatures along the length of the stiffener. As will be discussed below in connection with FIGS. 29-44, these stiffeners may also include one or more tapered features along their lengths. For example, referring to FIG. 29, a stiffener in the form of an I-beam 362 has an upper cap 366 connected to a lower cap 369 by a tapered web region 370. The upper and/or lower caps 366, 369 of the beam 362 may be similar to the cap regions 24 of the beam 20 shown in FIG. 1. The beam 362 includes at least one feature that is tapered along the length of the beam 362. In this example, the height H and thus the web region 370 of the beam 362 is tapered, varying in height H along the beam's length. In this example, the lower cap 369 of the beam 362 extends substantially parallel to the longitudinal axis 364 of the beam 362, while the upper cap 366 is inclined relative to the longitudinal axis 364.

Figure 30:
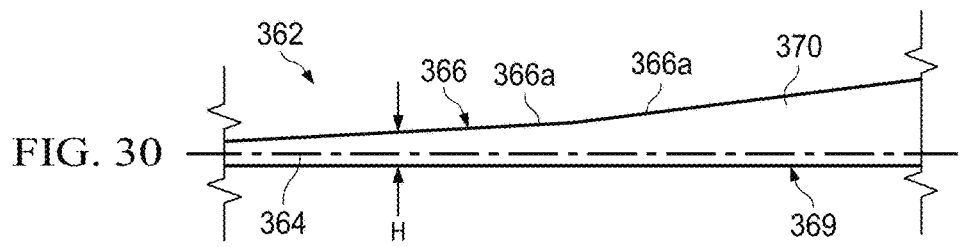
FIGS. 30-32 are illustrations of side views respectively showing other stiffeners having tapered features along their lengths.

FIG. 30 illustrates another example of a tapered beam 362 in which the beam height H varies nonlinearly. In this example, the beam 362 has two differing tapered web sections 366a that vary in height H at differing linear rates.

Figure 31:
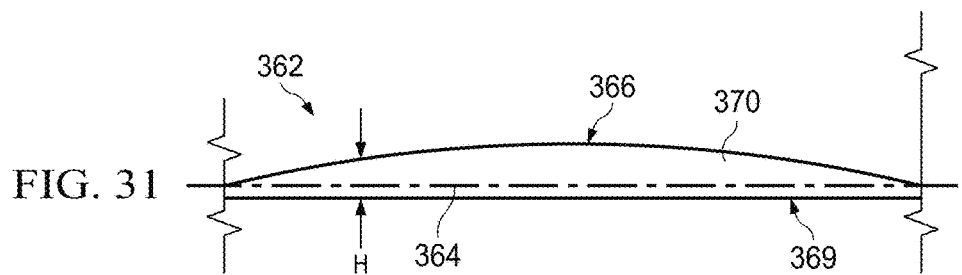

FIG. 31 illustrates a further example of a tapered beam 362 in which the upper cap 366 is curved along the length of the beam 362 and the height H of the web region 370 varies continuously along the beam's length.

Figure 32:
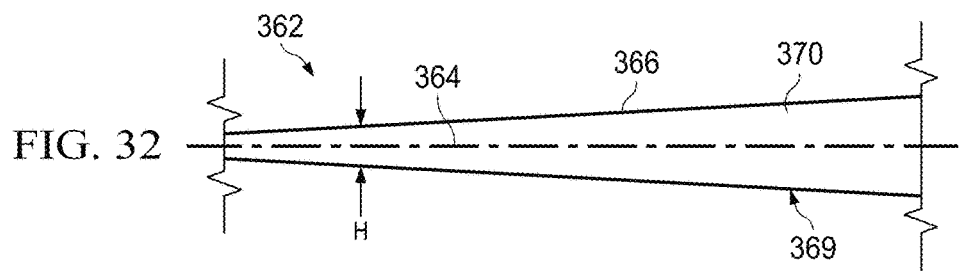

Still another example of a tapered beam 362 is shown in FIG. 32 in which the web region 370 is symmetrically tapered about the longitudinal axis 364 of the beam 362.

The tapered beams shown in FIGS. 29-32 are merely illustrative of a wide range of tapered features that may be possible. For example, a beam 362 may have a combination of differing tapers, including linear or nonlinear tapers along its length.

Figure 33:
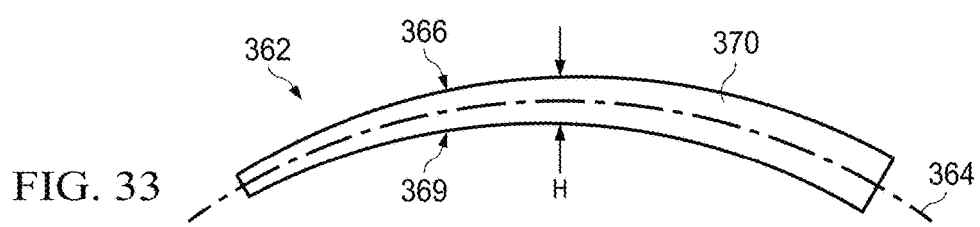
FIG. 33 is an illustration of a side view of a curved stiffener having a tapered feature along its length.

As previously noted, the tapered beam 362 may include one or more features of the beams previously described in connection with FIGS. 1-28. For example, as shown in FIG. 33, a tapered beam 362 may have a web region 370 possessing both a curvature and a variable or tapered height H, as well as caps 366, 369 that are also curved along the length of the beam 362.

Figure 34:
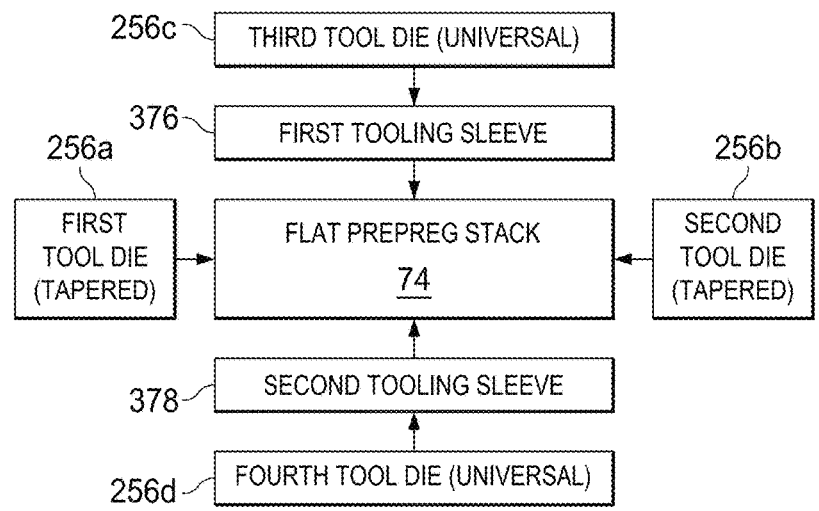
FIG. 34 is a broad functional block diagram of consolidation tooling employed to compression mold stiffeners having tapered features along their length.

Attention is now directed to FIG. 34 which broadly illustrates the components of consolidation tooling 375 used to mold and consolidate fiber reinforced thermoplastic parts having one or more features that are tapered along the length of the part, such as the beams 362 shown in FIGS. 29-33. The consolidation tooling 375 may be employed in a consolidation structure 78 such as that shown in FIG. 4, to compression mold and consolidate a flat stack, 74 or 76 of prepreg in a semi-continuous process into a cross section with tapered height or width. The consolidation tooling 375 comprises first, second, third and fourth elongate tool dies 256a, 256b, 256c, 256d respectively, and first and second elongate tooling sleeves 376, 378 respectively.

The flat stack of prepreg 74 is sandwiched between the first and second tooling sleeves 376, 378 which are compressed by the first, second, third and fourth tool dies 256a-256d. At least one of the first and second tooling sleeves 376, 378 is tapered along its length to produce a tapered feature of the part being fabricated, which, in the case of the beams 362 shown in FIGS. 29-33, comprises the web region 370. The taper of the tooling sleeves 376, 378 may be linear, non-linear or curved along all of only a portion of the length of the part, depending on the geometry of the part being fabricated. As will become later apparent in this description, depending on the geometry of the part, both of the first and second tooling sleeves 376, 378 may have a cross sectional shape that varies along the length of the tooling sleeve 376, 378 to form the desired taper. Also depending on the geometry of the part being fabricated, at least one of the first and second tool dies 256a, 256b is tapered along its length, and in some embodiments, both of the first and second tool dies 256a, 256b are tapered along their respective lengths. Each of the third and fourth tool dies 256c, 256d may be a universal tool die that has a cross sectional shape, such as a rectangular shape, that is substantially constant along its length.

Figure 35:
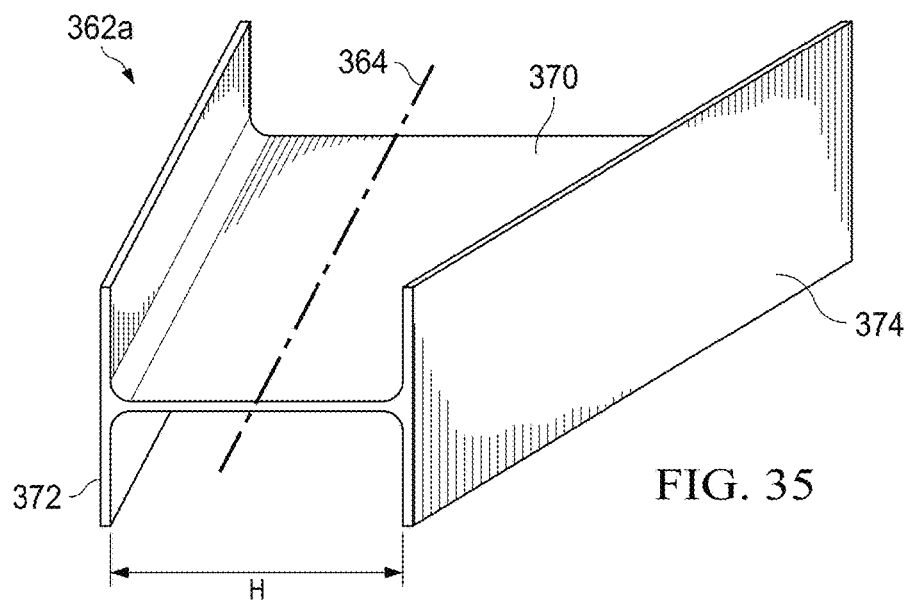
FIG. 35 is an illustration of a perspective view of a tapered beam having an I-shaped cross section.

FIG. 35 illustrates an embodiment of a tapered beam 362a that is substantially similar to the beam 362 shown in FIG. 32. Beam 362a has a substantially I-shaped cross section defined by first and second cap regions 372, 374 that are connected by a web region 370. While the illustrated beam 362a is substantially symmetrically tapered about the longitudinal axis 364 of the beam 362a, in other embodiments, the tapering may not be symmetric.

Figure 36:
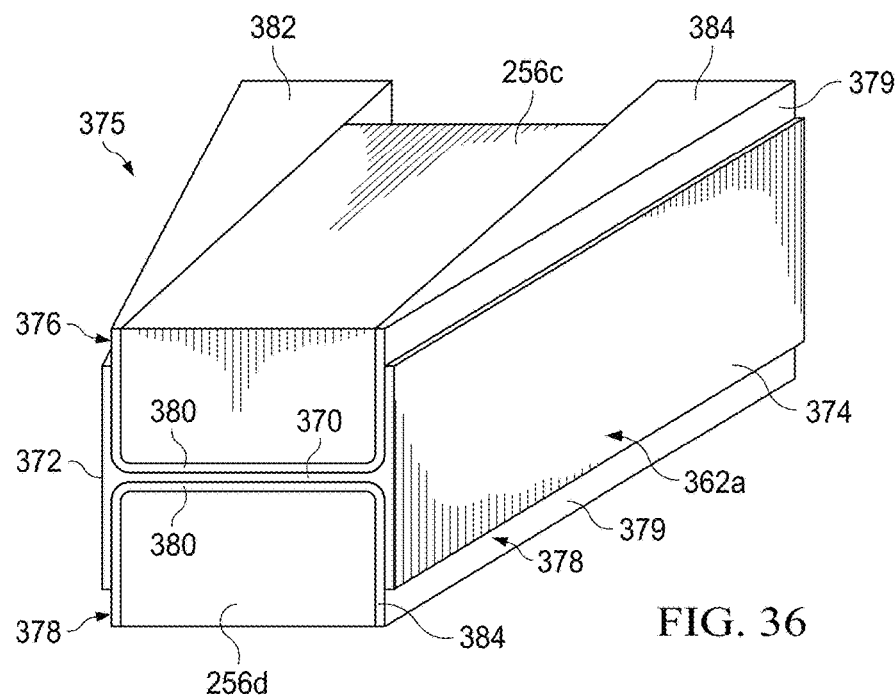
FIG. 36 is an illustration of a perspective view of the beam of FIG. 35, also showing parts of the consolidation tooling used in fabricating the beam.
Figure 37:
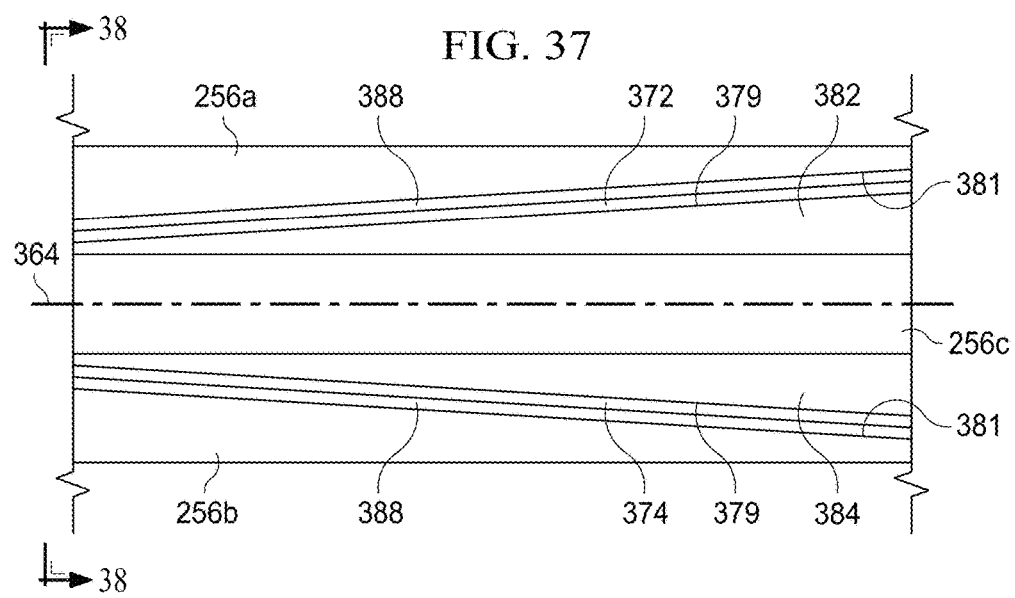
FIG. 37 is an illustration of a top view of consolidation tooling used to compression mold the tapered beam shown in FIGS. 35 and 36.
Figure 38:
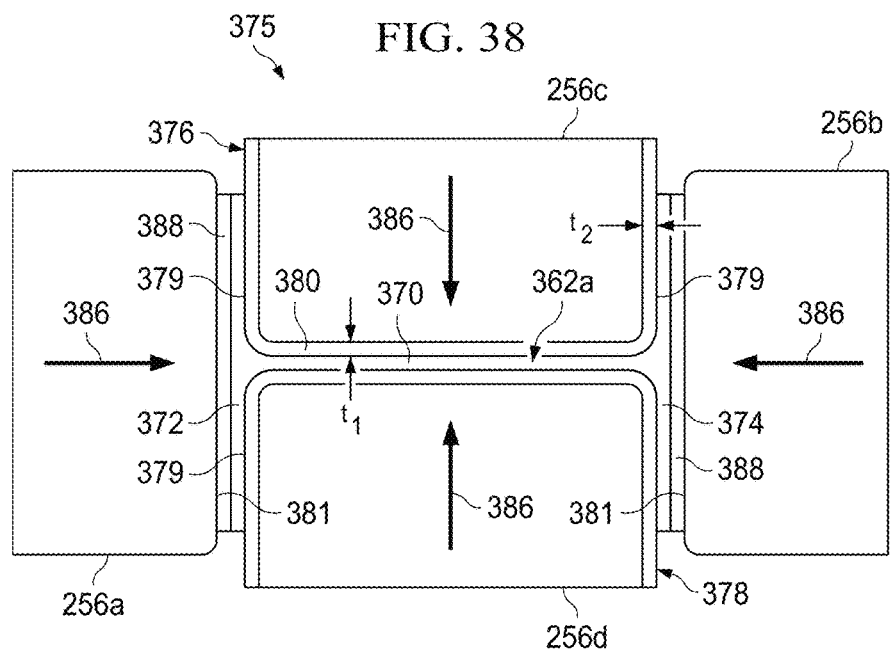
FIG. 38 is an illustration of an end view in the direction shown as 38 in FIG. 37.

FIGS. 36, 37 and 38, illustrate the consolidation tooling 375 used to continuously compression mold the beam 362a shown in FIG. 35. As previously discussed in connection with FIG. 34, the consolidation tooling 375 comprises first, second, third and fourth tool dies 256a-256d respectively, e.g. first, second, third and fourth elongate tool dies 256a-256d respectively, and first and second tooling sleeves 376, 378 respectively, e.g. first and second elongate tooling sleeves 376, 378 respectively. In this example, each of the tooling sleeves 376, 378 is tapered along its length. Each of the first and second tooling sleeves 376, 378 is generally U-shaped in cross section and includes first and second laterally spaced, flange portions 382, 384 respectively, and a tapered web portion 380. The flange portions 382, 384 are respectively tapered along their length. In the illustrated embodiment, the flange portions 382, 384 are tapered in opposite directions to each other, however in other embodiments, they may be tapered in the same direction. The thickness $t_1$ of the web portion 380 may be substantially constant along the length of the tooling sleeve 376, 378, whereas the thickness $t_2$ of the flange portions 382, 384 may vary along the length of the sleeve, depending upon the geometry of the beam being fabricated.

In some embodiments, only one of the flange portions 382, 384 may be tapered. In other embodiments the flange portions 382, 384 may be tapered differently from each other. In still other embodiments, the thickness $t_1$ may vary along the length of the tooling sleeve 376, 378. Tapering of either or both of the flange portions 382, 384, results in the web portion 380 also being tapered along its length, in accordance with the varying height H. The tooling sleeves 376, 378 function to apply substantially uniform pressure on the surface of the part (e.g. beam 362a) being fabricated, and may be made of a durable material such as, without limitation, stainless steel that is capable of handling the repetitious, high heat cycles. The sides 379 of the tooling sleeves 376, 378 mating the laminate part may be fabricated with all of the desired part features such as ply buildups, ramps, pockets, part curvature, variable overall height, etc.

Referring particularly to FIGS. 36 and 37, each of the first and second tool dies 256a, 256b is tapered along it length to substantially match the taper of the tooling sleeve 376, 378. Thus, the taper of the first tool die 256a is complementary to that of the first tooling sleeve 376, and the taper of the second tool die 256b is complementary to that of the second tooling sleeve 378. Each of the third and fourth tool dies 256c, 256d is a universal tool die having a rectangularly shaped cross section that is substantially constant along the length of the tool die 256c, 256d. The third and fourth tool dies 256c, 256d are respectively are displaced into and received within the first and second tooling sleeves 376, 378. As in previous embodiments, the first and second tooling sleeves 376, 378 along with the formed beam 362a move past the tool dies 256a, 256b. 256c, 256d in an incremental or step-wise manner during the forming and consolidation process previously described in connection with a typical consolidation structure of the type shown in FIGS. 4 and 19.

Referring particularly to FIGS. 37 and 38, the consolidation tooling 375 may further include side tooling sheet members 388 similar to side tooling sheet members 92 previously discussed in connection with FIGS. 4 and 5. The side tooling sheet members 388 are sandwiched between the cap regions 372, 374 of the beam 362 and the first and second tool dies 256a, 256b. As indicated by the arrows 386 in FIG. 38, the third and fourth tool dies 256c, 256d compress the web region 370 of the beam 362 against the web portions 380 of the first and second tooling sleeves 376, 278. The first and second tool dies 256a, 256b laterally compress the cap regions 372, 374 of the beam 362a against the outer faces 379 of the first and second tooling sleeves 376, 378. The lateral force applied by the first and second tool dies 256a, 256b is reacted by the third and fourth tool dies 256c, 256d. As best seen in FIG. 38, the inner faces 381 of the first and second tool dies 256a, 256b are tapered along their respective lengths in directions opposite the taper of the outer faces 379 of the flange portions 382, 384. Thus, the taper of the inner faces 381 of the tool first and second tool dies 256a, 256b is complementary to the taper of the outer faces 379 of flange portions 382, 384 of the first and second tooling sleeves 376, 378.

Figure 39:
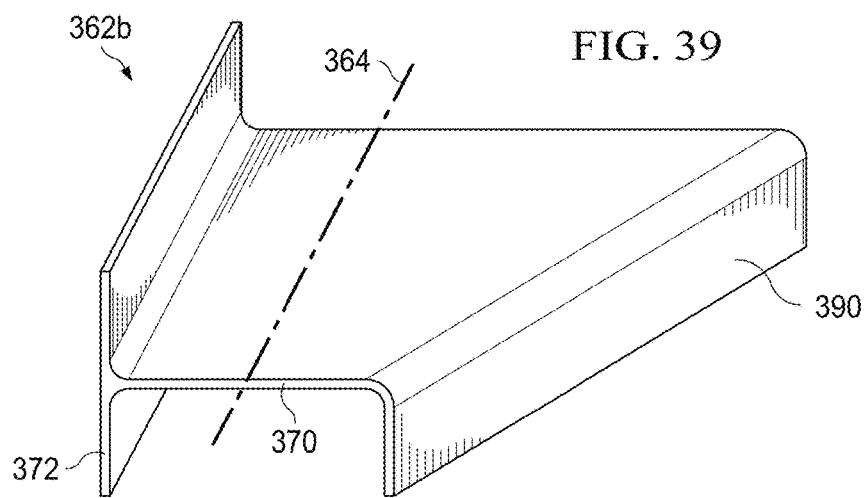
FIG. 39 is an illustration of a perspective view of a tapered beam having a J-shaped cross section.
Figure 40:
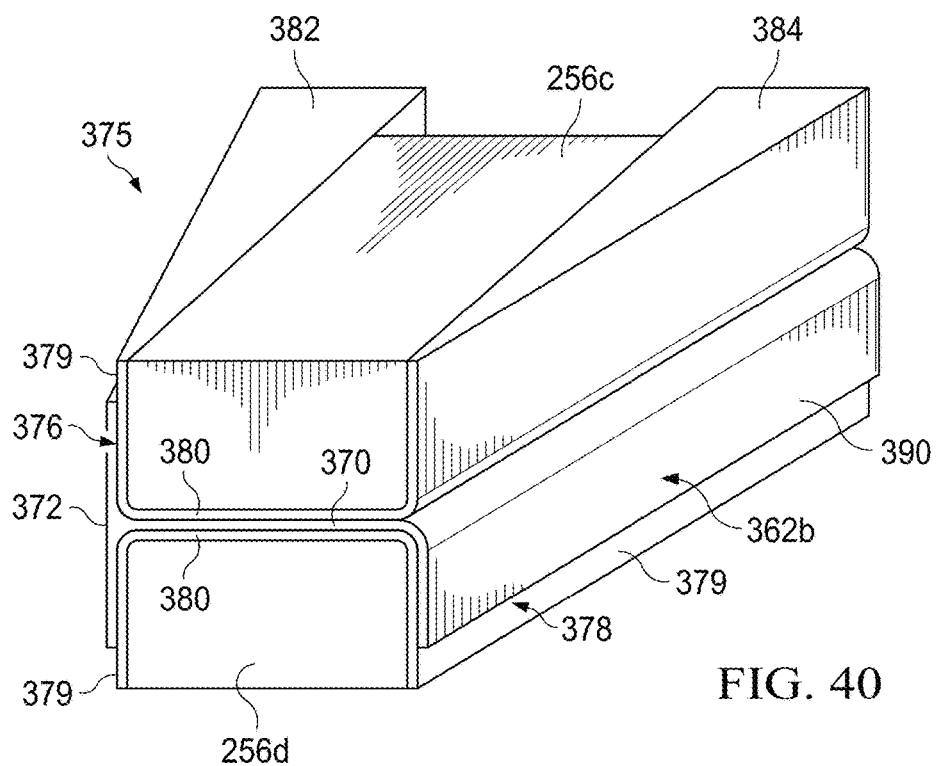
FIG. 40 is an illustration perspective view similar to FIG. 39 but also showing parts of the consolidation tooling used in fabricating the tapered beam.

FIG. 39 illustrates another embodiment of a tapered beam 362b having a substantially J-shaped cross section. The tapered beam 362b includes a cap region 372, and a single bottom flange 390 connected to the cap region 372 by a web region 370. In this example, the cap region 372 and the flange 390 are symmetrically tapered along the longitudinal axis 364 of the beam 362b, however, in other embodiments, the tapering may not be symmetric. FIG. 40 illustrates parts of the consolidation tooling 375 employed to fabricate the tapered beam 362b shown in FIG. 39. Similar to the consolidation tooling 375 shown in FIGS. 36, 37 and 38, consolidation tooling 375 used to fabricate the tapered beam 362b employs first and second tapered sleeves 376, 378 each having a flange portion 382, 384 and a web portion 380. The flange 390 of the beam 362b is formed against the outer face 379 of one of the tapered flange portions 384 of tooling sleeve 378, while the cap region 372 of the tapered beam 362b is formed against the outer faces 379 of both of the first and second tooling sleeves 376, 378. In one alternative of the present embodiment, the first tooling sleeve 376 and the second tooling sleeve 378 may include a tapered web portion, e.g., web portion 380, for forming a web region of a stiffener and a flange portion 384 for forming a flange region of the stiffener.

Figure 41:
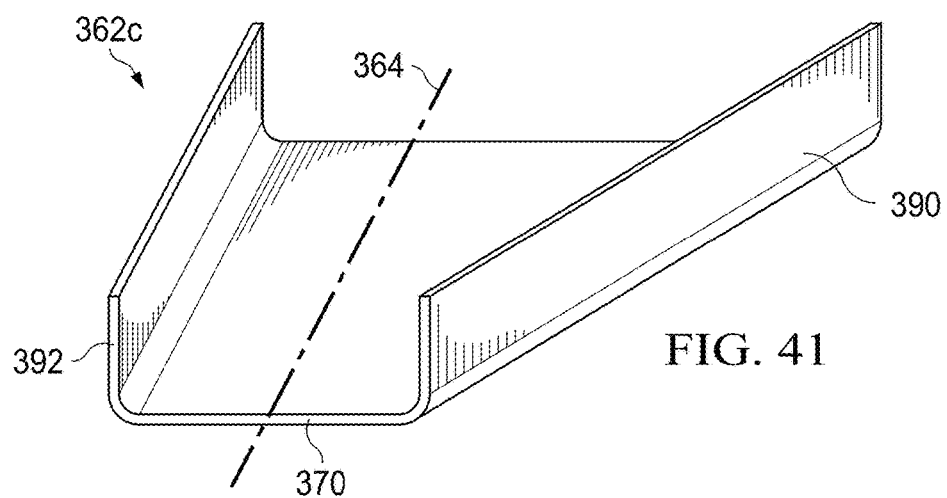
FIG. 41 is an illustration of a perspective view of a tapered beam having a C-shaped cross section.
Figure 42:
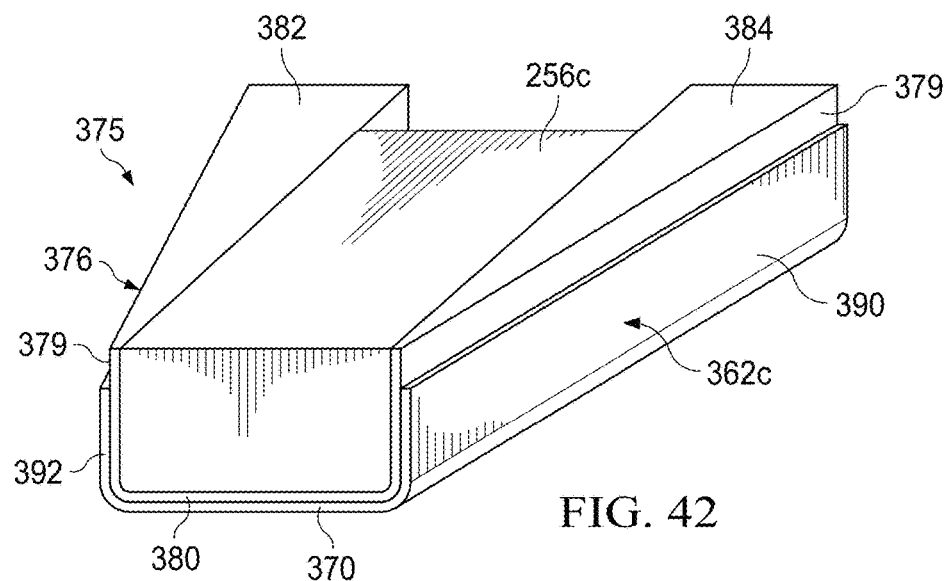
FIG. 42 is an illustration of a perspective view similar to FIG. 41 but also showing parts of the consolidation tooling used in fabricating the tapered beam.

FIG. 41 illustrates another embodiment of a tapered beam 362c having a substantially C-shaped cross section formed by a pair of flanges 390, 392 connected by a web region 370. In this example, the web region 370 is tapered in height along the length of the beam 362c, and the flanges 390, 392 are symmetrically inclined relative to the longitudinal axis 364 of the beam 362c, however, in other embodiments they may not be symmetrically inclined. FIG. 42 illustrates parts of the consolidation tooling 375 used to fabricate the tapered beam 362c shown in FIG. 41. In this example, only a single tapered tooling sleeve 376 is needed to form the web region 370 and the flanges 390, 392 of the tapered beam 362c. The single tapered tooling sleeve 376 includes a pair of flange portions 382, 384 connected by a web portion 380. The flanges 390 of the beam 362c are formed against the outer faces 379 of the flange portions 382, 384 of tapered tooling sleeve 378, while the web region 370 of the tapered beam 362c is formed against the web portion 380 of the tapered tooling sleeve 376. In embodiments where the tapered beam 362c is not symmetrically tapered, only one of the flange portions 382, 384 of the tooling sleeve 376 need be tapered.

Figure 43:
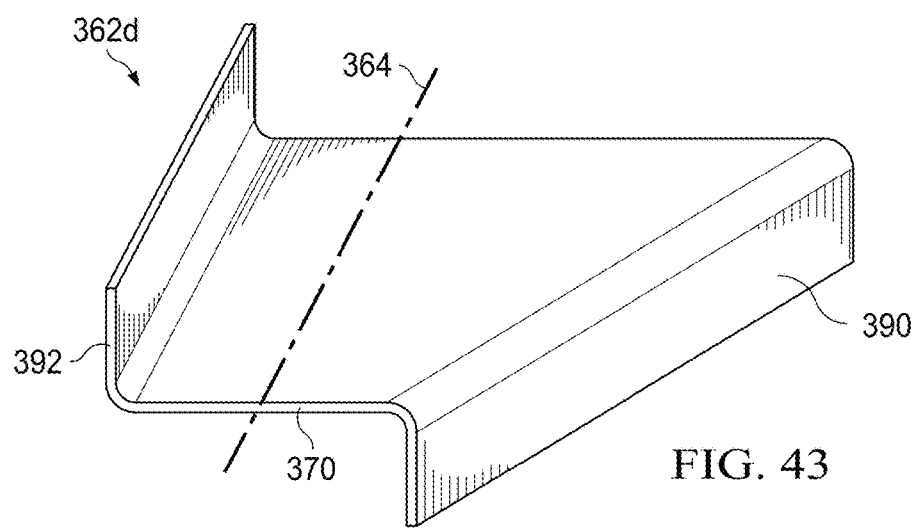
FIG. 43 is an illustration of a perspective view of a tapered beam having a Z-shaped cross section.
Figure 44:
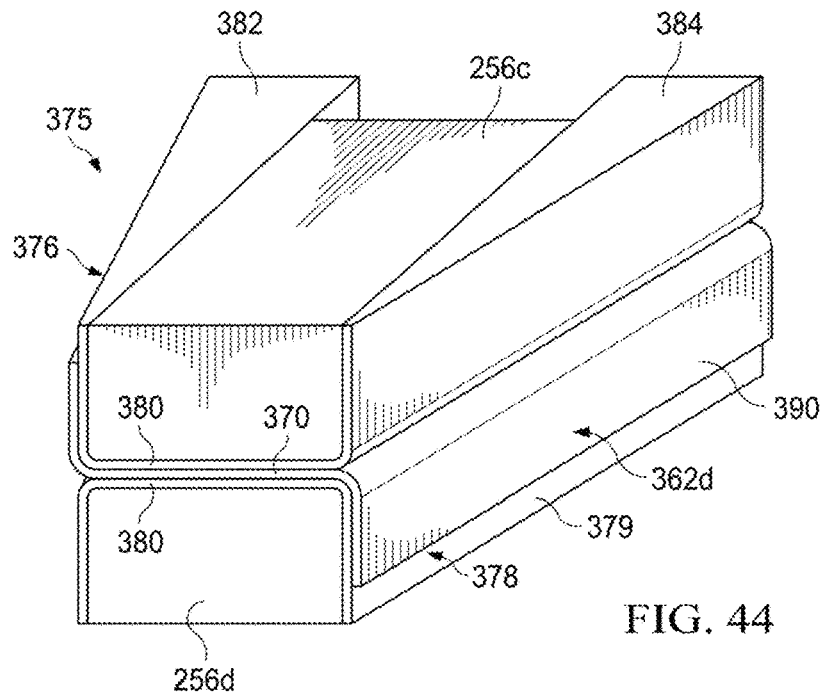
FIG. 44 is an illustration of a perspective view showing parts of the consolidation tooling used in fabricating the tapered beam shown in FIG. 43.

FIG. 43 illustrates still another embodiment of a tapered beam 362d having a substantially Z-shaped cross section formed by oppositely directed flanges 390, 392 connected by a web region 370. FIG. 44 illustrates parts of the consolidation tooling 375 used to fabricate the tapered beam 362d of FIG. 43. The consolidation tooling 375 includes first and second tooling sleeves 376, 378 that function along with first and second tapered tool dies 256a, 256b (not shown in FIG. 44), and third and fourth universal tool dies 256c, 256d to mold and consolidate a flat ply stack into the beam 362d.

Figure 45:
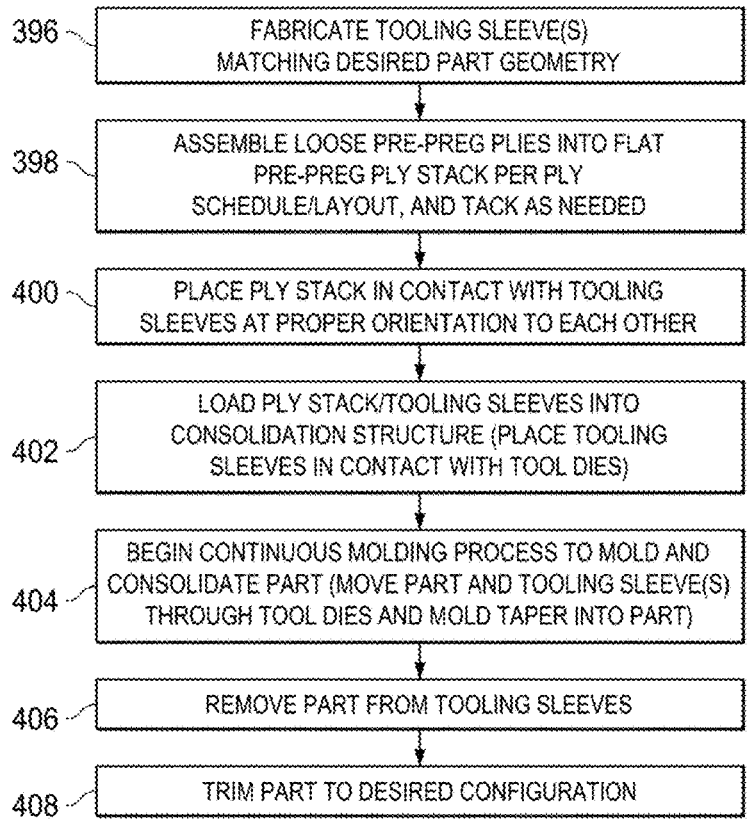
FIG. 45 is an illustration of a flow diagram showing the steps of a method of continuous compression molding of tapered stiffeners.

Attention is now directed to FIG. 45 which illustrates the overall steps of a method of fabricating a plastic resin stiffener such as a beam of the type shown in FIGS. 29-44. Beginning at 396, one or more tooling sleeves 376, 378 are fabricated that match the desired tapered part geometry. At 398, loose prepreg plies are assembled into a flat prepreg ply stack 74 according to a predefined ply schedule and layout, and are then tacked, as necessary. At 400, the ply stack 74 is placed in contact with the tooling sleeves 376, 378 at the proper orientation to each other. At 402, the ply stack 74 along with the tooling sleeves 376, 378 are loaded into a consolidation structure 78. During this loading process, the tooling sleeves 376, 378 are placed in contact with tool dies 256a-256d. At 404, a continuous molding process is begun to mold and consolidate the part. As previously described, the continuous molding process may be carried out using a consolidation structure 78 of the type shown in FIGS. 4 and 19, in which the part and the tooling sleeves 376, 378 are moved through the tool dies 256a-256d as the tool dies 256a-256d compress the part against the tooling sleeves 376, 378. At 406, the part is removed from the tooling sleeves 376, 378 after it is fully consolidated, and at 408, the part is trimmed to the desired configuration.

Figure 46:
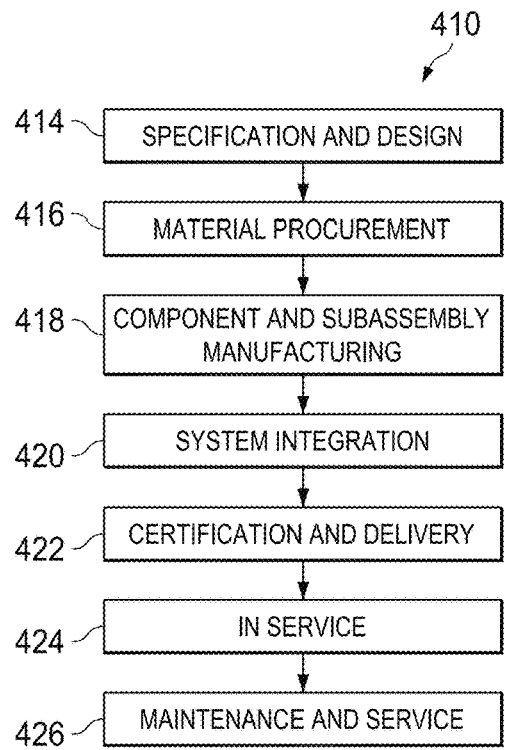
FIG. 46 is an illustration of a flow diagram of aircraft production and service methodology.
Figure 47:
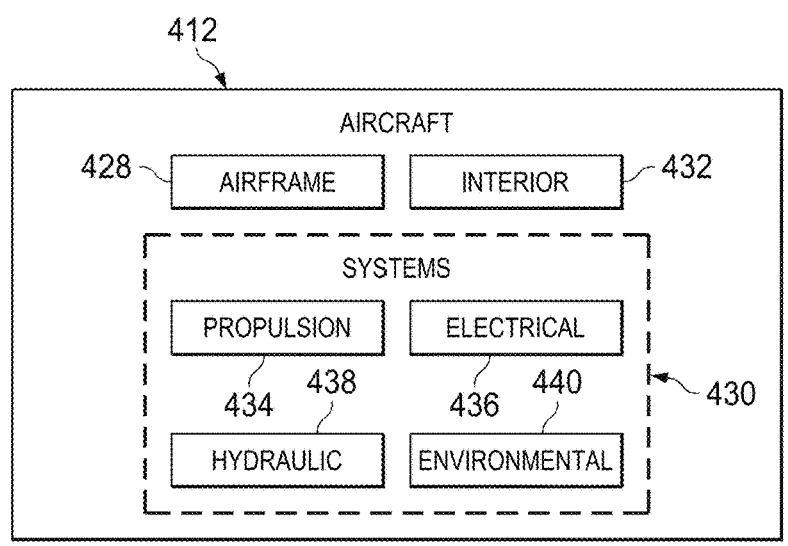
FIG. 47 is an illustration of a block diagram of an aircraft.

Referring now to FIGS. 46 and 47, embodiments of the disclosure may be employed in the context of an aircraft manufacturing and service method 410 as shown in FIG. 46 and aircraft 412 as shown in FIG. 47. Turning first to FIG. 46, an illustration of an aircraft manufacturing and service method 410 is depicted in accordance with an advantageous embodiment. During pre-production, aircraft manufacturing and service method 410 may include specification and design 414 of aircraft 412 in FIG. 47 and material procurement 416.

During production, component and subassembly manufacturing 418 and system integration 420 of aircraft 412 in FIG. 47 takes place. Thereafter, aircraft 412 in FIG. 47 may go through certification and delivery 422 in order to be placed in service 424. While in service 424 by a customer, the aircraft 412 in FIG. 47 is scheduled for routine maintenance and service 424, which may include modification, reconfiguration, refurbishment, and other maintenance or service.

Each of the processes of aircraft manufacturing and service method 410 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 47, an illustration of an aircraft 412 is depicted in which an advantageous embodiment may be implemented. In this example, aircraft 412 is produced by aircraft manufacturing and service method 410 in FIG. 46 and may include airframe 428 with plurality of systems 430 and interior 432. Examples of systems 430 include one or more of propulsion system 434, electrical system 436, hydraulic system 438, and environmental system 440. Any number of other systems may be included. Although an aerospace example is shown, different advantageous embodiments may be applied to other industries, such as the marine and automotive industries.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Consolidation tooling for use in a continuous compression molding machine to fabricate a fiber reinforced thermoplastic part having a varying height, comprising:
   a first tool die and a second tool die, the first tool die and the second tool die each adapted to mold a multi-ply stack of thermoplastic prepreg into a part; and
   at least a first tooling sleeve movable between the first tool die and the second tool die, the first tooling sleeve having at least a first tapered portion engageable with the multi-ply stack of thermoplastic prepreg,
   wherein the first tool die is tapered along its length substantially complementary to the first tapered portion of the first tooling sleeve,
   a third tool die and a fourth tool die, the third tool die and the fourth tool die each adapted to compress and mold the multi-ply stack of thermoplastic prepreg into a web region of the part,
   a first tooling member attached to the first tool die and a second tooling member attached to the second tool die, wherein the first tooling member applies a first compressive force directly to the multi-ply stack of thermoplastic prepreg and the second tooling member applies a second compressive force directly to the multi-ply stack of thermoplastic prepreg.

2. The consolidation tooling of claim 1, wherein:
   the first tapered portion of the first tooling sleeve is a first tapered flange portion, and
   the first tooling sleeve includes a second tapered flange portion engageable with the multi-ply stack of thermoplastic prepreg.

3. The consolidation tooling of claim 2, wherein:
   the second tool die is tapered substantially complementary to the second tapered flange portion of the first tooling sleeve.

4. The consolidation tooling of claim 2, wherein the first tapered flange portion and the second tapered flange portion of the first tooling sleeve are tapered in opposite directions.

5. The consolidation tooling of claim 1, wherein the first tooling sleeve includes a web portion connected with a first tapered flange portion.

6. The consolidation tooling of claim 1, wherein the third tool die is disposed within the first tooling sleeve.

7. The consolidation tooling of claim 6, wherein the third tool die is elongate and has a substantially constant cross section along its length.

8. The consolidation tooling of claim 1, wherein at least one of the group consisting of the first tool die, the second tool die, and the first tooling sleeve includes non-uniform thickness contours.

9. The consolidation tooling of claim 1, wherein the first tooling sleeve is generally U-shaped in cross section.

10. The consolidation tooling of claim 1, wherein the first tooling sleeve is elongate and is curved along at least a portion of its length.

11. The consolidation tooling of claim 1, wherein the first tooling sleeve is configured to mold the multi-ply stack of thermoplastic prepreg into a beam having a cross sectional shape selected from the group consisting of:
 an I-shape,
 a J-shape,
 a Z-shape,
 a T-shape, and
 a C-shape.

12. The consolidation tooling of claim 1, further comprising: a second tooling sleeve movable between the first tool die and the second tool die, the second tooling sleeve having at least one tapered flange portion.

13. Consolidation tooling for use in a continuous compression molding machine to fabricate a fiber reinforced thermoplastic part having a varying height, comprising:
 a first tool die and a second tool die, the first tool die and the second tool die each adapted to mold a multi-ply stack of thermoplastic prepreg into a part, wherein the first tool die and the second tool die are horizontally opposed to each other;
 a third tool die and a fourth tool die, wherein the third tool die and the fourth tool die are each adapted to apply a compressive force in a vertical direction to the multi-ply stack of thermoplastic prepreg and mold the multi-ply stack of thermoplastic prepreg into a web region of the part, wherein the third tool die and the fourth tool die are vertically opposed to each other;
 a first tooling member attached to the first tool die, wherein the first tooling member extends vertically along an inwardly facing surface of the first tool die;
 wherein the inwardly facing surface of the first tool die is tapered along its length and the first tooling member applies a first compressive force, in a horizontal direction directly to the multi-ply stack of thermoplastic prepreg;
 a second tooling member attached to the second tool die, wherein the second tooling member extends vertically along an inwardly facing surface of the second tool die;
 wherein the inwardly facing surface of the second tool die is tapered along its length and the second tooling member applies a second compressive force, in the horizontal direction directly to the multi-ply stack of thermoplastic prepreg;
 a first tooling sleeve movable between the first tool die and the second tool die, the first tooling sleeve having at least a first tapered portion and at least a second tapered portion; and
 a second tooling sleeve movable between the first tool die and the second tool die, the second tooling sleeve having at least a first tapered portion and at least a second tapered portion.

14. The consolidation tooling of claim 13, wherein the first and second tooling sleeves are configured to mold the multi-ply stack of thermoplastic prepreg into a beam having a cross sectional shape comprising:
 a cap region; and
 a single bottom flange connected to the cap region by the web region, wherein the cap region extends parallel with a longitudinal axis of the beam along its length and the single bottom flange is angled with respect to the longitudinal axis of the beam along its length.

* * * * *